US008693037B2

(12) United States Patent
Miyaguchi

(10) Patent No.: US 8,693,037 B2
(45) Date of Patent: Apr. 8, 2014

(54) COMPUTER READABLE INFORMATION RECORDING MEDIUM STORING PRINTING SETTING EDITING PROGRAM, PRINTING SETTING EDITING APPARATUS AND PRINTING SETTING EDITING METHOD

(75) Inventor: Daigo Miyaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 13/356,939

(22) Filed: Jan. 24, 2012

(65) Prior Publication Data

US 2012/0194861 A1 Aug. 2, 2012

(30) Foreign Application Priority Data

Feb. 1, 2011 (JP) ................................. 2011-020219

(51) Int. Cl.
*G06F 3/12* (2006.01)
*H04N 1/60* (2006.01)
*H04N 1/40* (2006.01)

(52) U.S. Cl.
USPC ........... 358/1.15; 358/1.1; 358/1.13; 358/1.9; 358/3.24

(58) Field of Classification Search
USPC ......... 358/1.15, 1.9, 1.13, 1.1, 1.6, 3.24, 501, 358/537, 448, 452, 462; 715/200, 209, 243, 715/252, 256, 255, 273, 274, 276, 700, 750, 715/762, 810, 851; 345/594, 619, 625, 634, 345/650, 655, 660, 156, 157, 161, 163, 168, 345/501, 502, 520, 10, 24
See application file for complete search history.

(56) References Cited

U.S. PATENT DOCUMENTS

| 6,883,981 | B2 | 4/2005 | Kizaki et al. |
| 2007/0253020 | A1* | 11/2007 | Hull et al. ..................... 358/1.15 |
| 2008/0218816 | A1 | 9/2008 | Sakuramata et al. |
| 2008/0316517 | A1* | 12/2008 | Sato ............................. 358/1.13 |
| 2010/0123917 | A1* | 5/2010 | Minagawa ..................... 358/1.9 |

FOREIGN PATENT DOCUMENTS

| JP | 2001075950 A | 3/2001 |
| JP | 2002152488 A | 5/2002 |
| JP | 2004-185489 A | 7/2004 |
| JP | 2009-070302 A | 9/2007 |
| JP | 2008227584 A | 9/2008 |
| JP | 2009-070302 A | 4/2009 |

OTHER PUBLICATIONS

English language abstract for Patent Publication No. US-20080218816-A1 corresponds to JP-2008227584-A, Sep. 25, 2008.
English language abstract for Patent Publication No. US-6,883,981-B2 corresponds to JP-2004-185489-A, Jul. 2, 2004.

* cited by examiner

*Primary Examiner* — Ngon Nguyen
(74) *Attorney, Agent, or Firm* — Harness, Dickey & Pierce, PLC

(57) ABSTRACT

A computer readable information recording medium stores a printing setting editing program which when executed by one or plural processors, performs functions of a part configured to display on a display unit a job editing screen page including a preview area displaying preview images, sheet by sheet, obtained from modifying given data according to a printing setting and an exception page setting area used for setting an exception for the printing setting by sheet; and a part configured to apply information, indicating that the exception for the printing setting has been set, to a preview image, of the preview images being displayed in the preview area, which preview image corresponds to a sheet for which the exception for the printing setting has been set, and display the information.

8 Claims, 24 Drawing Sheets

FIG.7
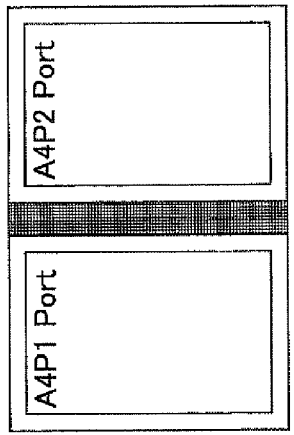
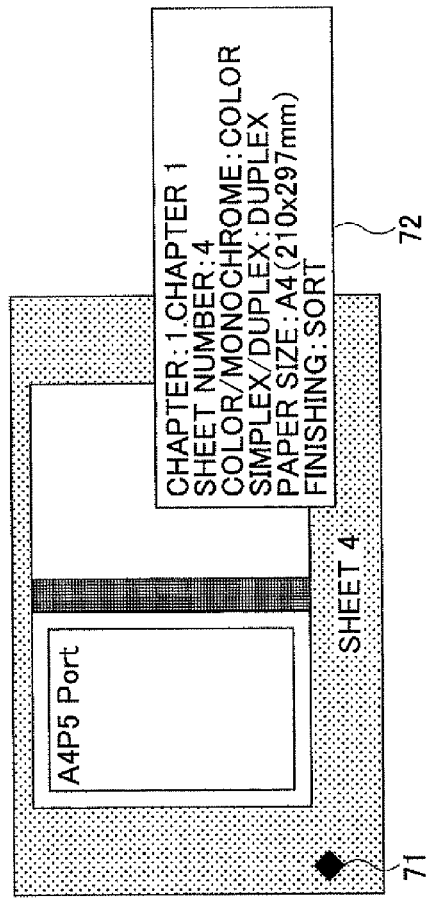
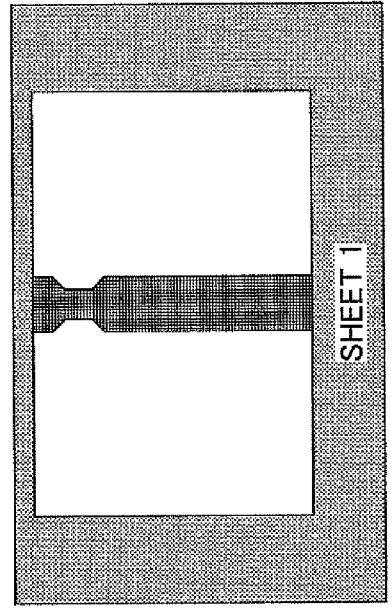
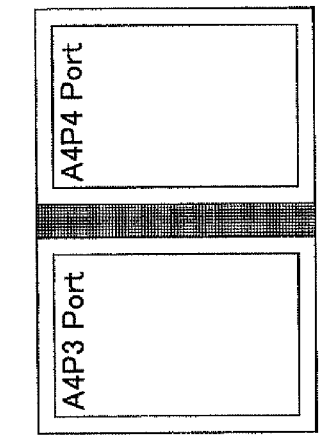

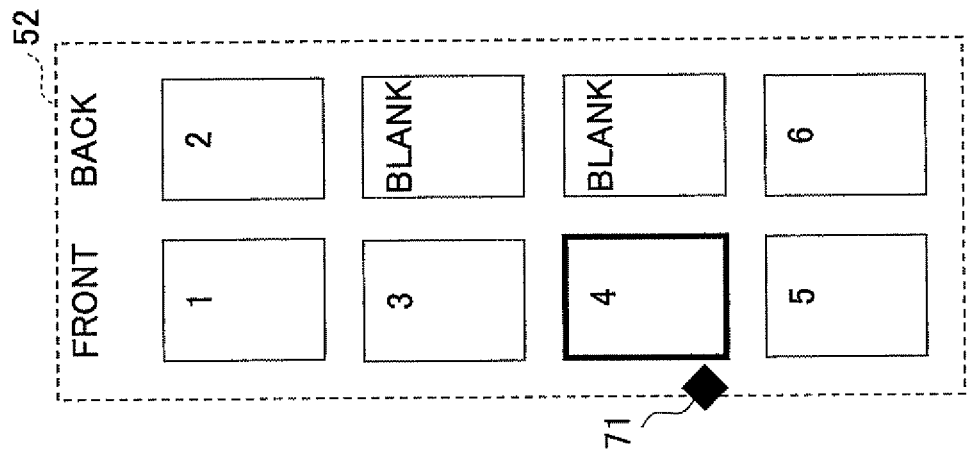
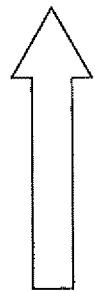
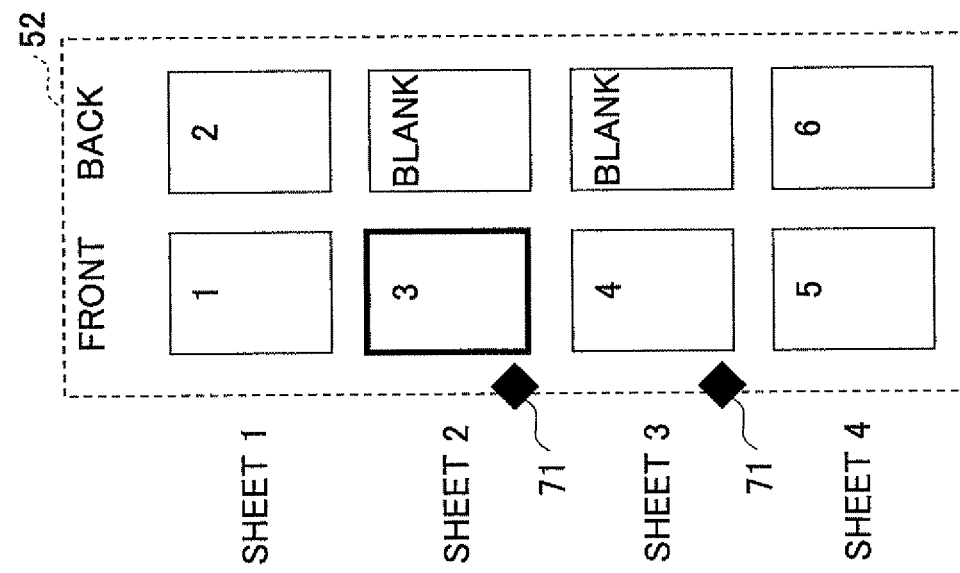

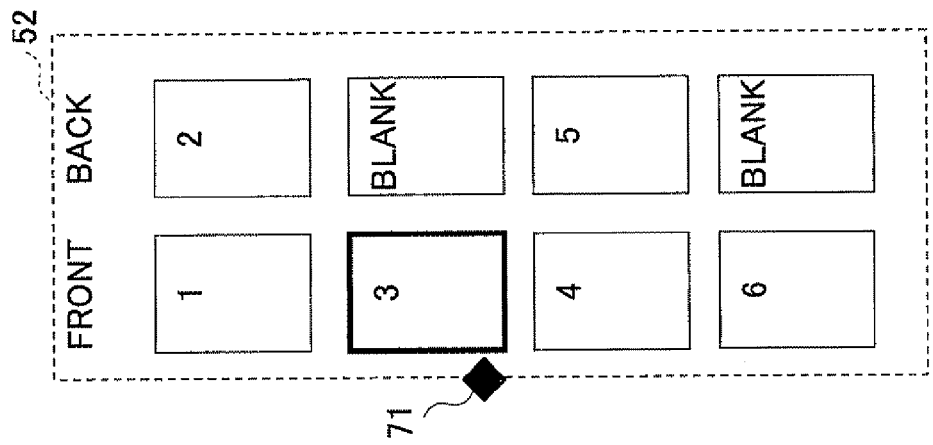
FIG.12B
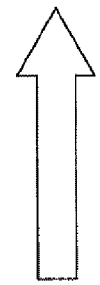
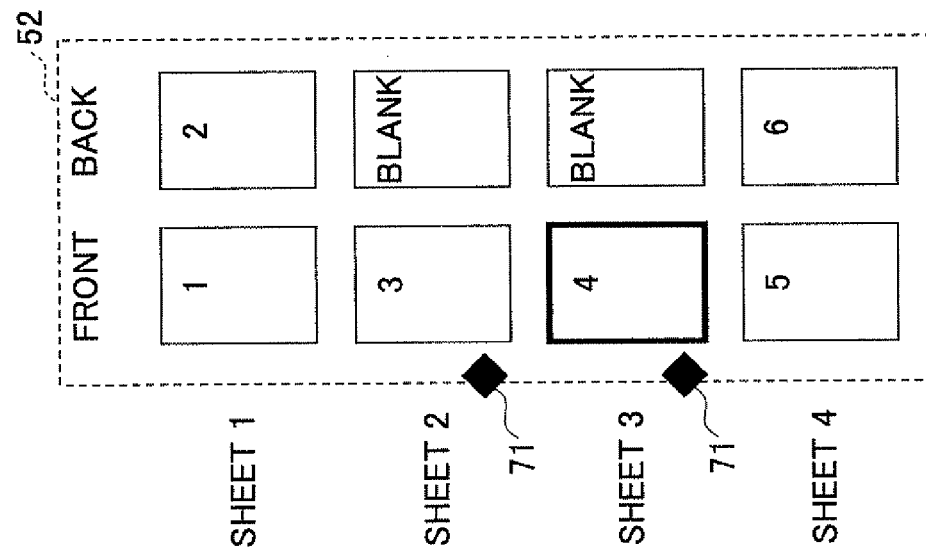
FIG.12A

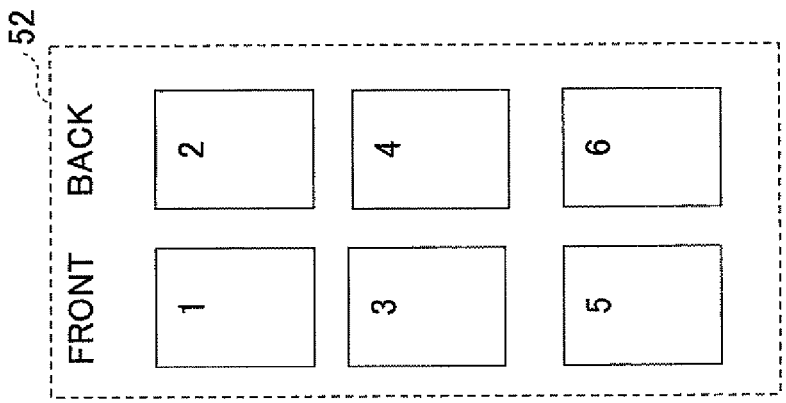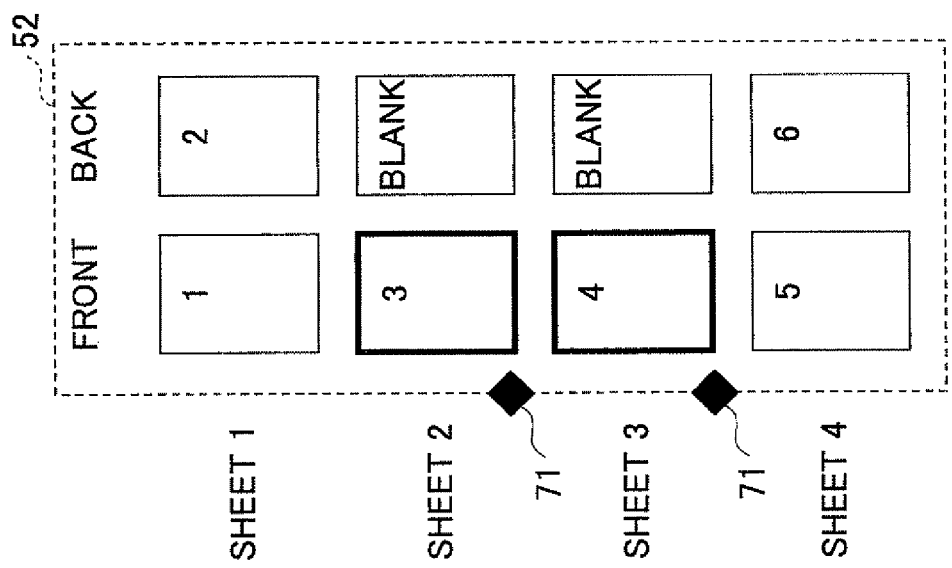

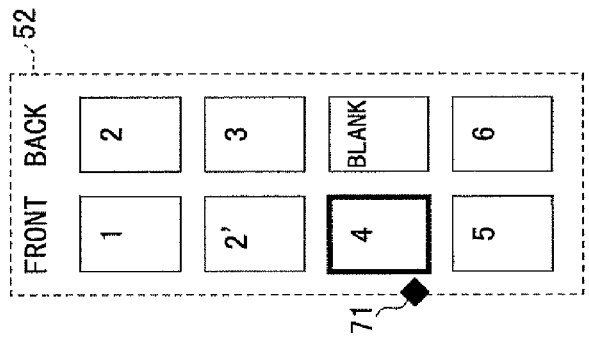
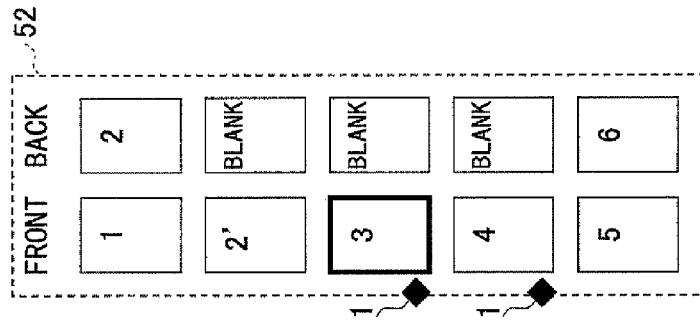
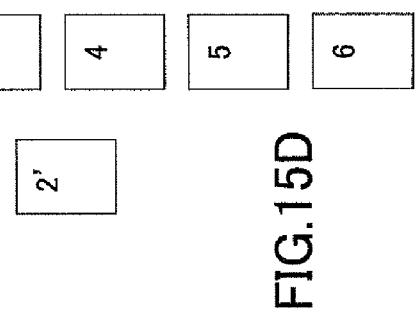
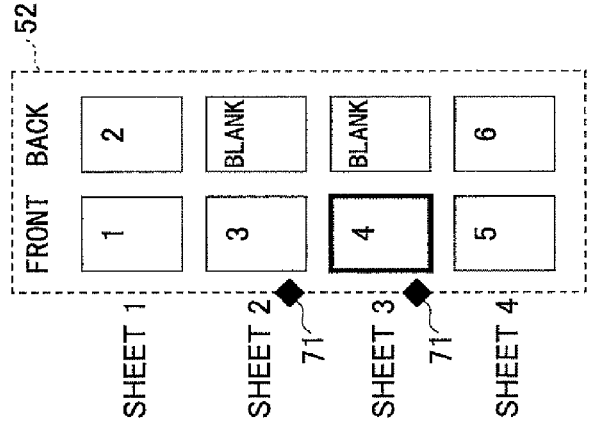

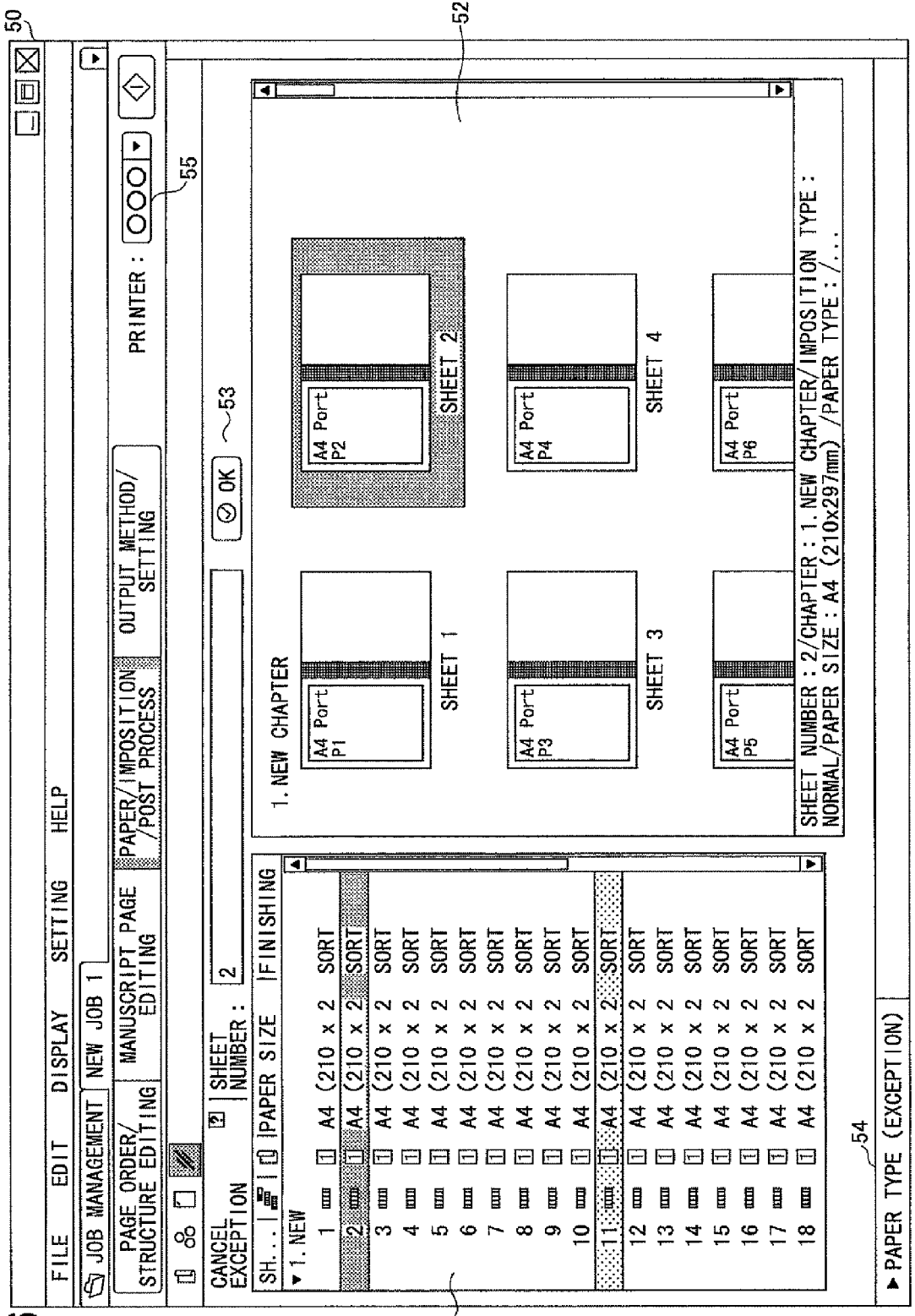

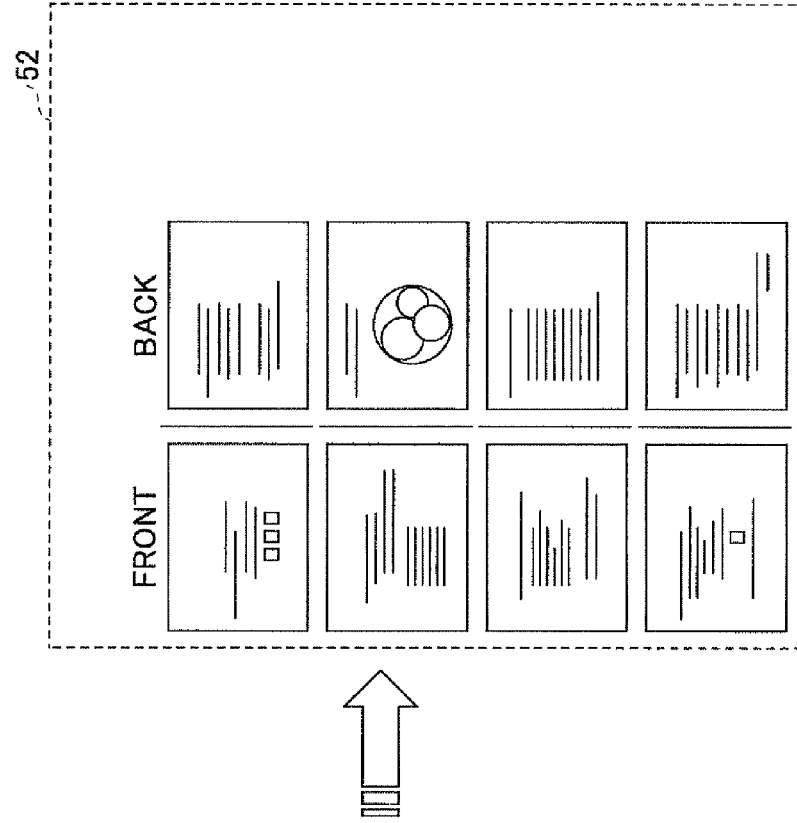
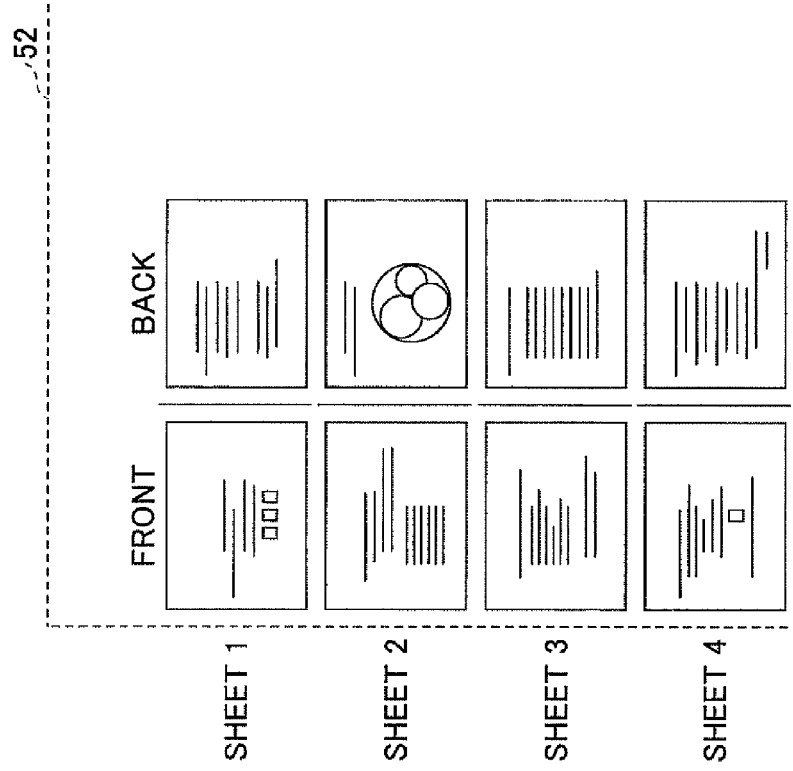

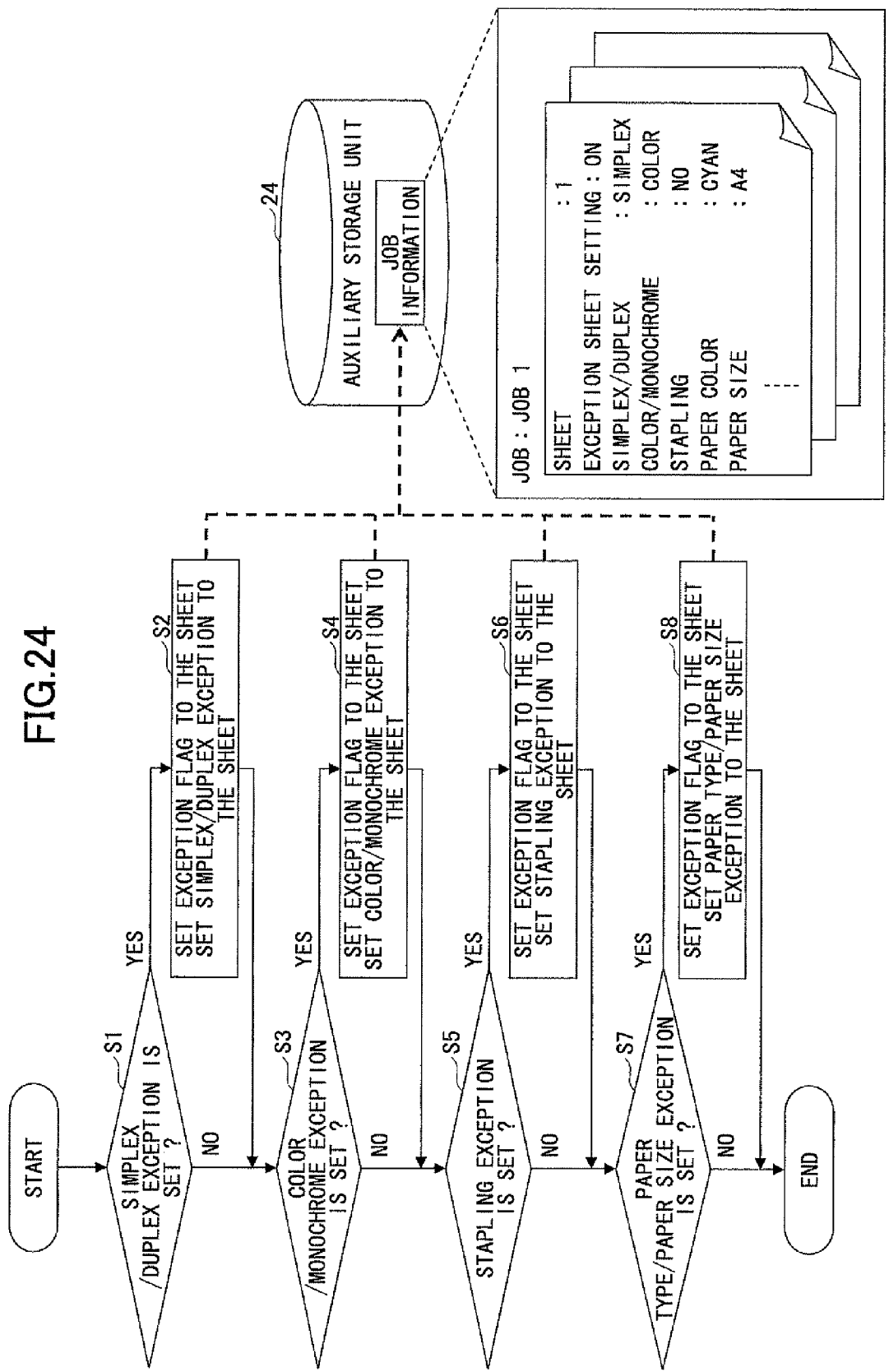

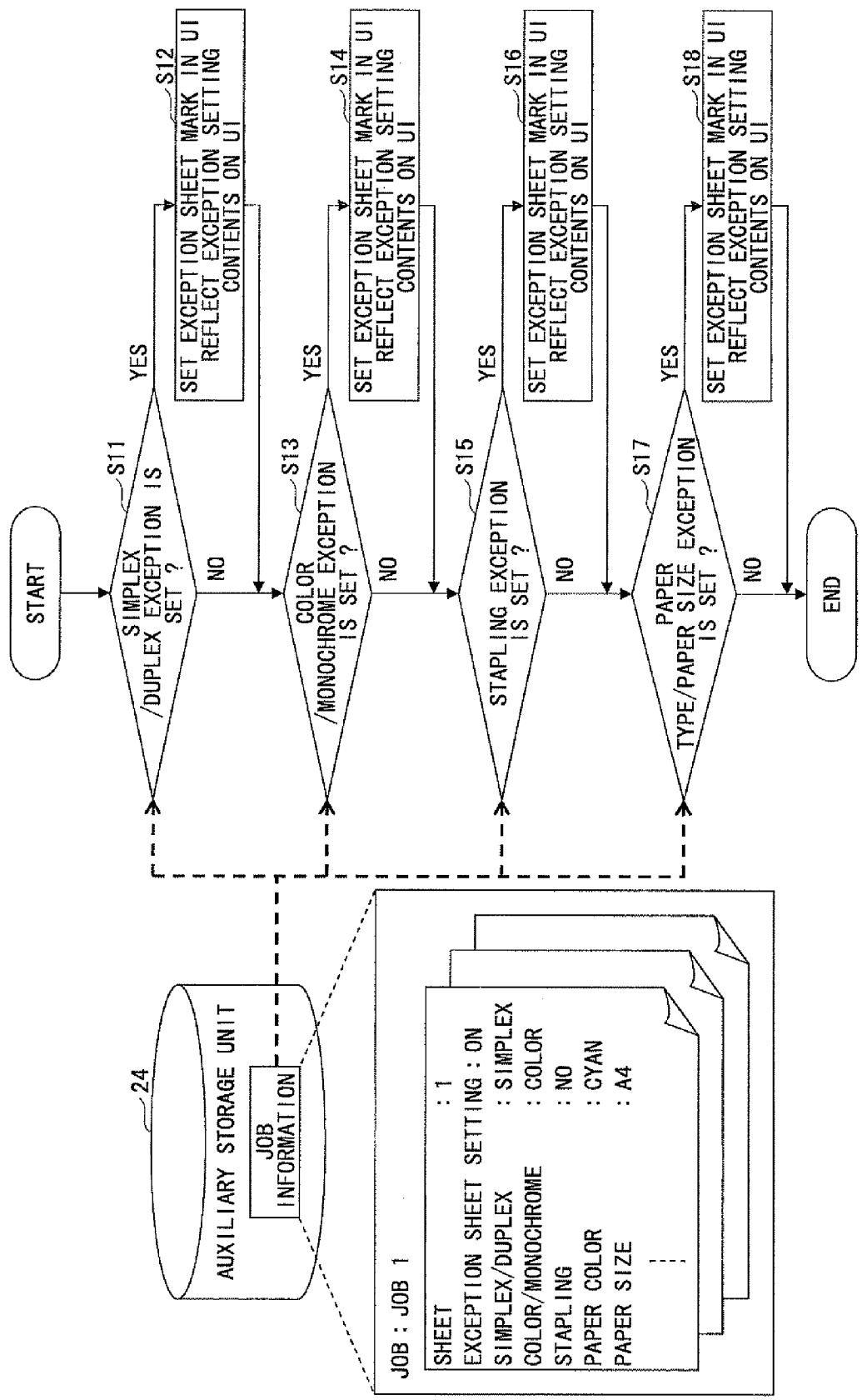

COMPUTER READABLE INFORMATION RECORDING MEDIUM STORING PRINTING SETTING EDITING PROGRAM, PRINTING SETTING EDITING APPARATUS AND PRINTING SETTING EDITING METHOD

BACKGROUND OF THE INVENTION

1. Field of the Invention

The present invention relates to a computer readable information recording medium storing a printing setting editing program, a printing setting editing apparatus and a printing setting editing method, with which an operator edits a printing setting.

2. Description of the Related Art

A company in the commercial printing industry, which receives printed pages (a catalog, an advertisement or the like) from a customer, generates printed output pages requested by the customer from the printed pages, delivers the thus generated printed output pages to the customer and receives a reward from the customer, carries out plural processes from the reception of the printed pages to the delivery of the printed output pages. The plural processes from the reception of the printed pages to the delivery of the printed output pages include, for example, a reception of printed pages from the customer, a reception of printing conditions for the printed output pages from the customer, pre-press processes such as a color change, a layout change and a binding position change, proof printing for the customer to check the pre-press result, printing processes, post-press processes (post processes) such as binding the printed output pages, compression bonding of the printed output pages or the like after the printing processes, and delivery of the printed output pages to the customer. It is noted that the plural processes from the reception of the printed pages to the delivery of the printed output pages may increase or decrease depending on the printing conditions for the printed output pages requested by the customer.

In the related art of the commercial printing industry, there are many orders from customers to carry out printing in large quantities, and the above-mentioned plural processes from the reception of the printed pages to the delivery of the printed output pages, for example, are carried out to execute the many orders. Further, in many cases, for such orders of printing in large quantities, printing conditions from customers for printed output pages are fixed. Therefore, in the commercial printing industry in the related art, printed output pages requested by customers are generated through cycles in which a large quantity (lot) of printing is carried out according to fixed printing conditions, and after the printing for the lot is finished, another lot of printing is carried out after the printing conditions are changed.

In the printing cycles, the above-mentioned plural processes from the reception of the printed pages to the delivery of the printed output pages are carried out in many cases, when printing conditions from customers for printed output pages are changed. Therefore, in a case where printing conditions from customers for printed output pages are not changed, a commercial printer can carry out printing continuously according to the fixed printing conditions, and thus, it is possible to carry out printing in large quantities with high efficiency.

Recently, a print on demand (POD) market has appeared in which a commercial printer delivers a relatively small lot of printed output pages to a customer with a short delivery time. In the POD market, orders from plural customers are received in many cases. As a result, in the POD market, in many cases, printed pages sent to a commercial printer from customers include many different types of printed pages, or printing conditions requested by the customers for printed output pages include many different conditions.

Furthermore, recently, digitizing of printed pages has proceeded, and a computer has been used to control generation of printed output pages. For example, workflow techniques of sending printed pages from a customer in a form of electronic data to a printer via a communication network, and controlling the above-mentioned plural processes from reception of printed pages to delivery of printed output pages, have appeared. For example, according to the workflow techniques, there is a configuration in which printing operations in the above-mentioned plural processes from reception of printed pages to delivery of printed output pages are defined by a job ticket using a job definition format (JDF), and the printing operations are controlled in a printing system.

Along with such a change in the printing environment, commercial printers have proceeded with introduction of computers into printing systems for generating printed output pages for received orders. On the other hand, commercial printers currently need to build printing systems which can meet various printing conditions for printed output pages requested by customers and so forth. Further, in order to generate various printed output pages requested by customers, it becomes necessary to meet customers' requests, from a system viewpoint by introducing plural printer apparatuses and/or peripheral apparatuses (i.e., device apparatuses), and from a working process viewpoint by changing the above-mentioned plural processes from reception of printed pages to delivery of printed output pages at relatively short cycles.

Commercial printers thus need to meet customers' requests in the above-mentioned manner, and also, need to improve the operational efficiency in order to produce profits. As a method to improve the operational efficiency, there is a method of simplifying operations.

For example, techniques are known in which an operator operates a printing setting editing apparatus to cause the printing setting editing apparatus to display a preview image obtained from modifying electronic data of printed pages sent from a customer according to a given printing setting such as simplex/duplex, stapling, monochrome/color, or the like. Further, a spool data apparatus is known by which it is possible to easily edit a printing target displayed as a preview image, for the purpose of lightening the operator's workload (for example, see Japanese Laid-Open Patent Application No. 2002-152488).

Further, in order to meet recent diversified printing requests, techniques are known in which electronic data of printed pages sent from a customer is partially modified according to a given printing setting such as simplex/duplex, stapling, monochrome/color, or the like, and is used to print printed output pages. For example, a printing control apparatus is known in which in a condition where a preview image is displayed, a printing setting for the entirety of printed pages sent from a customer and a printing setting for each of chapters are separately carried out (for example, see Japanese Laid-Open Patent Application No. 2004-185489).

SUMMARY OF THE INVENTION

According to one aspect of the present invention, a computer readable information recording medium stores a printing setting editing program which when executed by one or plural processors, performs functions of a part configured to display on a display unit a job editing screen page including a preview area displaying preview images, sheet by sheet, obtained from modifying given data according to a printing setting and an exception page setting area used for setting an exception for the printing setting by sheet; and a part configured to apply information, indicating that the exception for the printing setting has been set, to a preview image, of the preview images being displayed on in the preview area, which preview image corresponds to a sheet for which the exception for the printing setting has been set, and display the information.

Other objects, features and advantages of the present invention will become more apparent from the following detailed description when read in conjunction with the accompanying drawings.

BRIEF DESCRIPTION OF THE DRAWINGS

FIG. 7 shows one example of preview images displayed in a preview area when exception pages have been set;

FIGS. 11A and 11B show one example of preview images displayed in the preview area when exceptions have been partially canceled;

FIGS. 12A and 12B show one example of preview images displayed in the preview area when the exceptions have been partially canceled;

FIGS. 13A and 13B show one example of preview images displayed in the preview area when the exceptions have been canceled;

FIGS. 15A, 15B and 15C show another example of preview images displayed in the preview area when a page is inserted;

FIG. 15D shows a state of pages concerning FIGS. 15A, 15B and 15C;

FIG. 16 shows another example of the job editing screen page;

FIGS. 23A and 23B show another example of preview images displayed in the preview area when an exception page has been set;

FIG. 24 is a flowchart of one example showing a procedure of processing carried out by a job editing part; and FIG. 25 is a flowchart of another example showing a procedure of processing carried out by the job editing part.

DETAILED DESCRIPTION OF THE PREFERRED EMBODIMENTS

Figure 1:
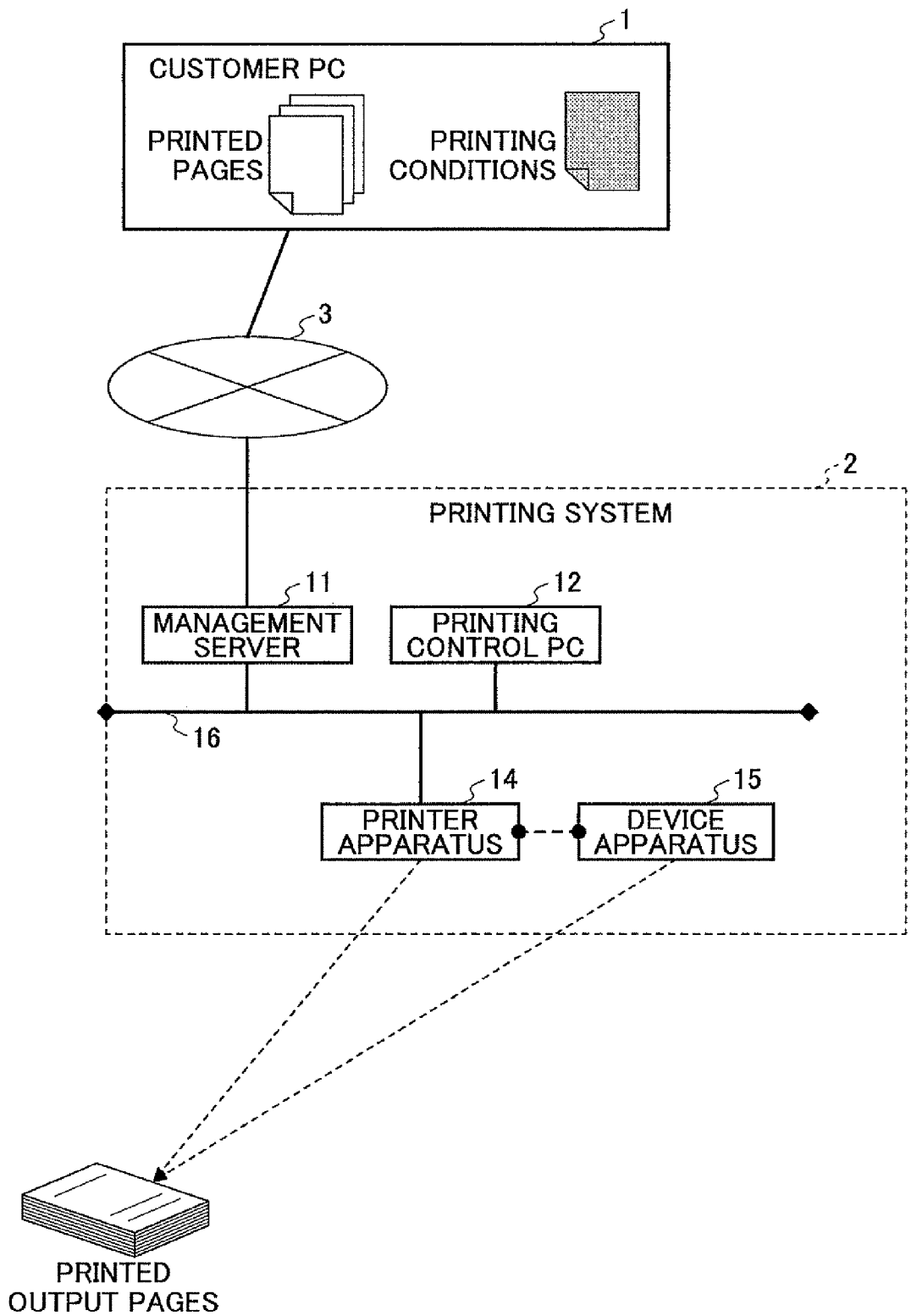
FIG. 1 is a system configuration diagram showing one example of a printing system according to an embodiment of the present invention.

In the above-mentioned printing control apparatus in the related art in which it is possible to separately carry out a printing setting for the entirety of given printed pages and a printing setting for each of chapters, it is not possible to easily distinguish a preview image having been modified according to the printing setting for the entirety of given printed pages and a preview image having been modified according to the printing setting for each of the chapters. For example, it is not possible to easily distinguish a preview image of printing data of monochrome and a preview image modified according to a printing setting of monochrome. Further, it is not possible to easily distinguish a preview image modified according to a printing setting of simplex and a preview image modified according to a printing setting of duplex.

Thus, in the printing control apparatus in the related art in which it is possible to separately carry out a printing setting for the entirety of given printed pages and a printing setting for each of chapters, it is not possible to easily distinguish a preview image having been modified according to the printing setting for the entirety of given printed pages and a preview image having been modified according to the printing setting for each of the chapters. Thus, the operability is not satisfactory.

An embodiment of the present invention has been devised in consideration of the problem, and an object of the embodiment of the present invention is to provide a computer readable information recording medium storing a printing setting editing program, a printing setting editing apparatus and a printing setting editing method by which it is possible to easily distinguish a preview image of printing data modified according to a partial printing setting.

According to the embodiment of the present invention, a computer readable information recording medium stores a printing setting editing program which when executed by one or plural processors, performs functions of a part configured to display on a display unit a job editing screen page including a preview area displaying preview images, sheet by sheet, obtained from modifying given data according to a printing setting and an exception page setting area used for setting an exception for the printing setting by sheet; and a part configured to apply information, indicating that the exception for the printing setting has been set, to a preview image of the preview images being displayed in the preview area, which preview image corresponds to a sheet for which the exception for the printing setting has been set, and display the information.

It is noted that a method, an apparatus, a system, a computer program, a computer readable information recording medium, a data structure, or the like, to which elements or expressions of the embodiment of the present invention or any combinations of the elements are applied, are also effective as embodiments of the present invention.

According to the embodiments of the present invention, it is possible to easily distinguish a preview image of printing data modified according to a partial printing setting.

Next, embodiments of the present invention will be described with reference to the figures.

FIG. 1 is a system configuration diagram showing one example of a printing system according to an embodiment of the present invention. In the system shown in FIG. 1, a customer PC 1 and a printing system 2 are connected using a network 3 such as the Internet. The customer PC 1 is an apparatus used by a customer. The printing system 2 is a system used by an operator of a commercial printer or the like.

Further, the printing system 2 includes a management server 11, a printing control PC 12, a printer apparatus 14, a device apparatus 15, and a network such as a local area network (LAN) 16. The management server 11, the printing control PC 12 and the printer apparatus 14 are connected using the network 16.

The management server 11 is an apparatus that manages data sent from the customer. The printing control PC 12 is an apparatus that carries out printing control. The printer apparatus 14 is an apparatus that prints printed output pages. The device apparatus 15 is an apparatus used in printing processes and post processes, and is connected to the printer apparatus 14.

The customer operates the customer PC 1, and transmits, via the network 3, printing data of printed pages and printing conditions to the management server 11 as the data sent from the customer. The management server 11 manages the data sent from the customer received from the customer PC 1. The operator who uses the printing system to generate the printed output pages accesses the management server 11 from the printing control PC 12 to obtain the data sent from the customer, and generates the printed output pages through the printing control as will be described later. Further, the printing control PC 12 obtains a status of the printer apparatus 14. The status of the printer apparatus 14 includes, for example, a state in which the printer apparatus 14 can carry out printing or a state in which the printer apparatus 14 cannot carry out printing, a state of the device apparatus 15 connected to the printer apparatus 14, and so forth.

Figure 2:
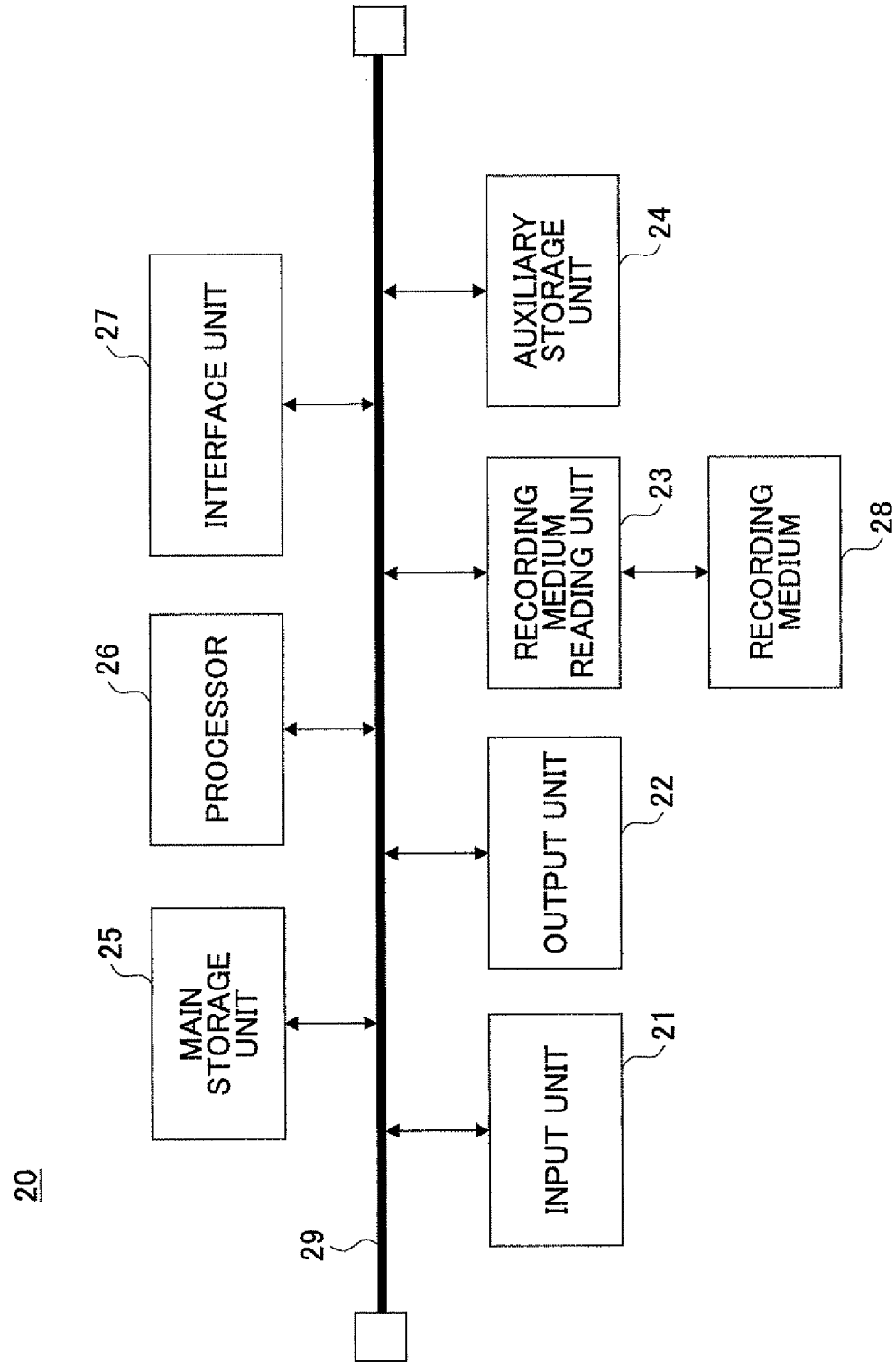
FIG. 2 is a hardware configuration diagram showing one example of a personal computer (PC)

The printing control PC 12 is realized by a PC having a hardware configuration shown in FIG. 2, for example. FIG. 2 is a hardware configuration diagram showing one example of a PC. The PC 20 shown in FIG. 2 includes an input unit 21, an output unit 22, a recording medium reading unit 23, an auxiliary (secondary) storage unit 24, a main storage unit (memory) 25, a processor 26 and an interface unit 27, which are mutually connected using a bus 29.

The input unit 21 includes, for example, a keyboard, a mouse and so forth. The input unit 21 is used for inputting various signals. The output unit 22 includes, for example, a display unit or the like. The output unit 22 is used to display various windows (screen pages), various data, or the like. The interface unit 27 includes, for example, a modem, a LAN card, and so forth. The interface unit 27 is used for connecting with the network 16.

A printing control program(s) (simply referred to as a program, hereinafter) loaded in the printing control PC 12 is(are), at least, one or some of the various programs that control the PC 20. The program is provided through, for example, delivery of a recording medium 28, downloading from the network 16, or such.

As the recording medium 28, any one of various types of recording media such as recording media storing information optically, electrically, or magnetically such as a CD-ROM, a flexible disk, a magneto-optical disk and so forth, semiconductor memories storing information electrically such as a ROM, a flash memory and so forth, can be used.

When the recording medium 28 storing the program is set in the recording medium reading unit 23, the program is installed in the auxiliary storage unit 24 via the recording medium reading unit 23. The program downloaded from the network 16 or the like is installed in the auxiliary storage unit 24 via the interface unit 27.

The auxiliary storage unit 24 stores the installed program, necessary files, data, and so forth. The main storage unit 25 reads the program from the auxiliary storage unit 24, and stores it, when starting up the program. Then, the processor 26 realizes various processing described later according to the program stored in the main storage unit 25.

Figure 3:
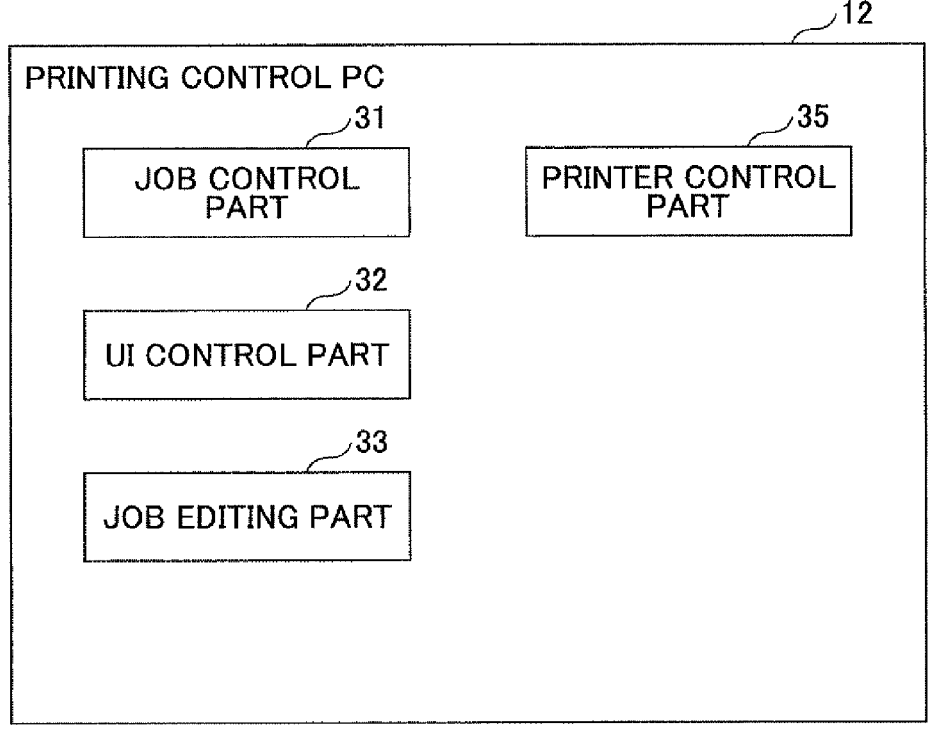
FIG. 3 is a processing block diagram showing one example a printing control PC.

In a case of the system shown in FIG. 1, the printing control PC 12 is realized by, for example, processing blocks shown in FIG. 3. FIG. 3 is a processing block diagram showing one example the printing control PC 12. The printing control PC 12 executes the program to realize a job control part 31, a user interface (UI) control part 32, a job editing part 33 and a printer control part 35.

The job control part 31 generates a job (job data) obtained from converting the data sent from the customer into a data form in which the data sent from the customer can be used for printing carried out by the printer apparatus 14. The job control part 31 converts the data sent from the customer to the data form in which the data sent from the customer can be used for printing carried out by the printer apparatus 14, i.e., as one example, a PostScript (PS) form that is common. The UI control part 22 submits various screen pages to the operator, and receives a printing setting from the operator.

The job editing part 33 carries out communications with the UI control part 32, and processes printing setting information such as a printing setting received by the UI control part 32. Further, the printer control part 35 obtains a status of the printer apparatus 14, and transmits the obtained status to the job control part 31. The printer control part 35 controls processing carried out by the printer apparatus 14 according to the job data.

As one example, in a case where an imposition setting has been carried out as a printing setting by the UI control part 32, the job editing part 33 processes the imposition setting information. By processing the imposition setting information, the job editing part 33 creates a JDF for carrying out printing for the job according to the imposition setting information. The job editing part 33 stores the imposition setting information in the created JDF.

Further, in a case where a post process setting has been carried out as a printing setting by the UI control part 32, the job editing part 33 processes the post process setting information. By processing the post process setting information, the job editing part 33 creates a JDF for carrying a post process according to the post process setting information. The job editing part 33 stores the post process setting information in the created JDF.

Further, in a case where a structure setting has been carried out as a printing setting by the UI control part 32, the job editing part 33 processes the structure setting information. By processing the structure setting information, the job editing part 33 creates a JDF for carrying out printing for the job according to the structure setting information. The job editing part 33 stores the structure setting information in the created JDF.

Further, in a case where a paper setting has been carried out as a printing setting by the UI control part 32, the job editing part 33 processes the paper setting information. By processing the paper setting information, the job editing part 33 creates a JDF for carrying out printing for the job according to the paper setting information. The job editing part 33 stores the paper setting information in the created JDF.

Further, in a case where an exception setting has been carried out as a printing setting by the UI control part 32, the job editing part 33 processes the exception setting information. By processing the exception setting information, the job editing part 33 creates a JDF for carrying out printing for the job according to the exception setting information. The job editing part 33 stores the exception setting information in the created JDF.

Figure 4:
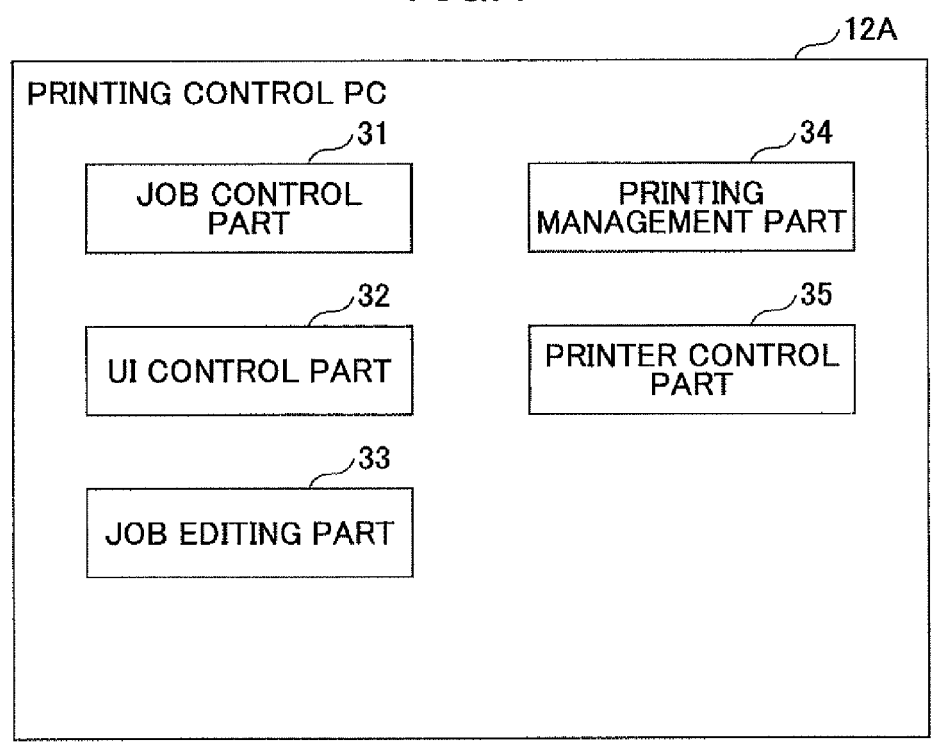
FIG. 4 is a processing block diagram showing another example a printing control PC.

FIG. 4 is a processing block diagram of another example of the printing control PC. A printing control PC 12A shown in FIG. 4 realizes the job control part 31, the UI control part 32, the job editing part 33, a printing management part 34 and the printer control part 35. The printing control PC 12A of FIG. 4 is different from the printing control PC 12 of FIG. 3 in that the printing control PC 12A has the printing management part 34.

The printing management part 34 carries out management of printing carried out by the printer apparatus 14. The printing management part 34 manages, for example, an execution state and/or an execution result of a printing job carried out by the printer apparatus 14, and the status of the printer apparatus 14, and causes the UI control part 32 to display the execution state and/or execution result of the printing job as is necessary. The printer control part 35 controls processing of the job data carried out by the printer apparatus 14 according to the printing management carried out by the printing management part 34.

Below, a flow of processing will be described for when in the configuration of the processing blocks of the printing control PC 12 of FIG. 3, the operator operates the printing control PC 12 and causes the printing control PC 12 to display a job editing screen page, and after that, the operator carries out an exception setting.

Figure 5:
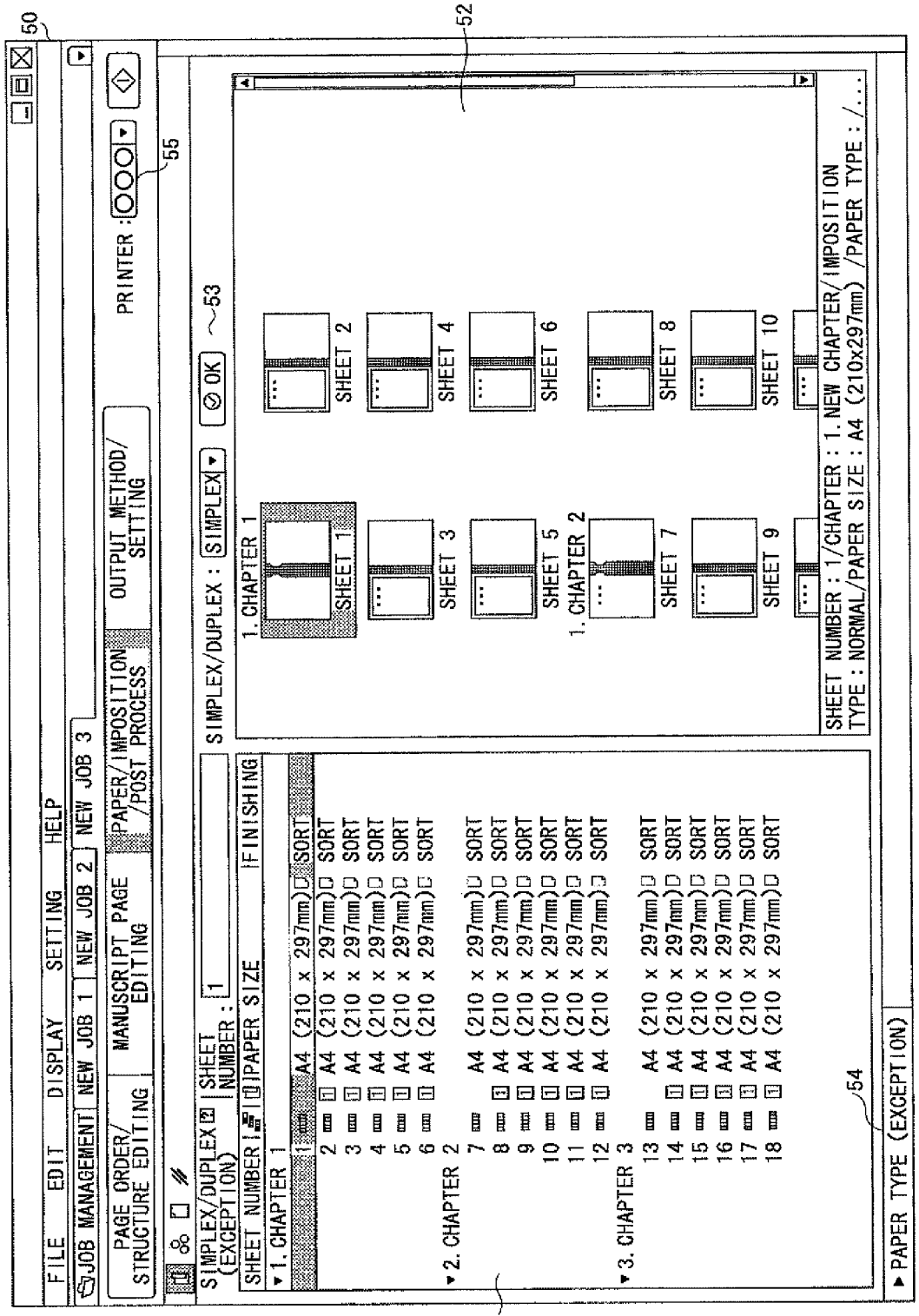
FIG. 5 shows one example of a job editing screen page.

The UI control part 32 submits the job editing screen page such as that shown in FIG. 5, for example, to the operator, and the operator carries out job editing using the job editing screen page. FIG. 5 shows one example of the job editing screen page. The job editing screen page 50 of FIG. 5 is an example of a screen page displayed when a paper/imposition/post process tab has been selected.

The job editing screen page 50 has a tree display area 51, a preview area 52, an exception page setting area 53, an exception page setting button 54 for paper type/paper size, and a printer selection area 55.

The tree display area 51 is an area displaying sheets according to the data sent from the customer in the form of a tree. The tree display area 51 indicates, for each of the sheets according to the data sent from the customer, the sheet number, monochrome/color, simplex/duplex, paper size, and finishing information. It is noted that "sheet" means a cut sheet.

The preview area 52 indicates preview images of the respective sheets according to the data sent from the customer on which modifications according to given printing settings, if any, have been carried out. The exception page setting area 53 is an area to be used when, for each of the sheets, an exception (exception page) of monochrome/color, simplex/duplex or stapling is set. The exception page setting button 54 for paper type/paper size is a button for displaying an exception page setting screen page for paper type/paper size for setting an exception (exception page) for paper type/paper size. The printer selection area 55 is an area for selecting the printer apparatus 14.

The job editing screen page 50 indicates a state in which "sheet 1" has been selected (a state of having been selected by clicking with the mouse or the like). For example, respective backgrounds of "sheet 1" in the tree display area 51 and "sheet 1" in the preview area 52 are highlighted by a dark yellow color or the like.

Figure 6:
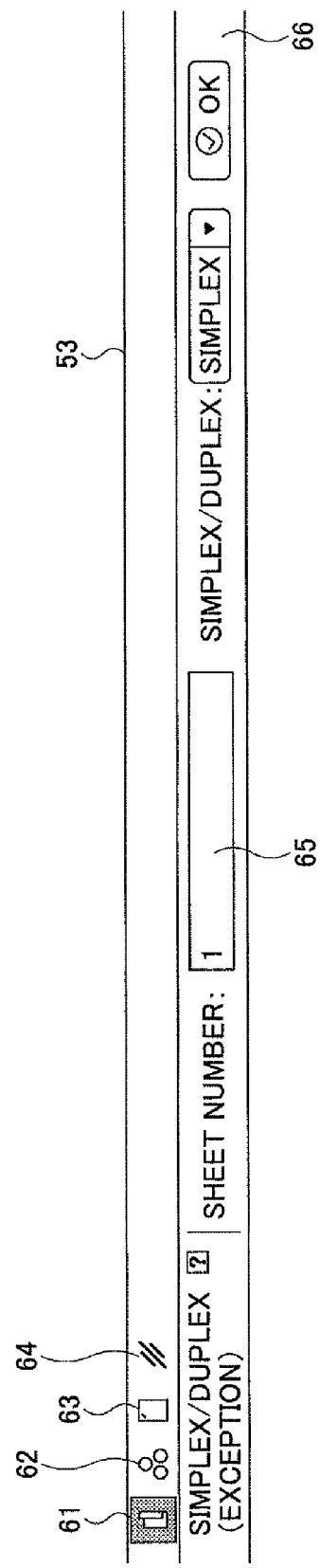
FIG. 6 is a magnified view showing an exception page setting area.

FIG. 6 shows a magnified view of one example of the exception page setting area. The exception page setting area 53 has, as items for setting exceptions, an icon 61 for selecting simplex or duplex, an icon 62 for selecting monochrome or color, an icon 63 for selecting stapling, an icon 64 for canceling an exception that has been set, a sheet number area 65 for the sheet number for which an exception is set or canceled, and an exception setting area 66 for setting an exception selected using any of the icons 61, 62 and 63. It is noted that any of the icons 61, 62 and 63 are turned gray if they correspond to items not supported by the printer apparatus 14 selected using the printer selection area 55, and thus, they cannot be selected.

For example, when simplex settings of "sheet 2" through "sheet 6" have been set to be duplex settings, respectively, using the exception page setting area 53 in the case of the job editing screen page of FIG. 5, preview images such as those shown in FIG. 7 are displayed in the preview area 52. It is noted that since the simplex settings of "sheet 2" through "sheet 6" have been thus set to be duplex settings, respectively, pages 1 through 5 on the respective front sides of "sheet 2" through "sheet 6" in FIG. 5 are allocated to the front and back sides of "sheet 2", front and back sides of "sheet 3" and front side of "sheet 4", respectively, in FIG. 7.

FIG. 7 shows one example of preview images displayed in the preview area when exception pages have been set. The "sheet 1" has a simplex setting. The "sheet 2" through "sheet 4" have duplex settings. Since the "sheet 2" through "sheet 4" are exception pages for which exceptions have been set using the exception page setting area 53, exception page application marks 71 are applied. As shown in FIG. 7, by thus applying the exception page application marks 71 to the exception pages for which the exceptions have been set, it is possible to easily distinguish the exception pages.

It is noted that the back side of the "sheet 1" in the preview image shown in FIG. 7 is blank since the "sheet 1" has the simplex setting. Further, the back side of the "sheet 4" in the preview image shown in FIG. 7 is blank since although the "sheet 4" has the duplex setting, the "sheet 4" is the last sheet (page) of the chapter.

Further, FIG. 7 shows a state in which the "sheet 1" has been selected (a state of having been selected by clicking the mouse or the like). For example, the background of the preview image of the "sheet 1" is highlighted by a dark yellow color, and thus, the selected sheet can be easily distinguished. Further, FIG. 7 shows a state where the "sheet 4" has been focused on (a state of having been focused on, using a pointer of the mouse or the like). For example, the background of the preview image of the "sheet 4" is highlighted by a light yellow color, and thus, the focused on sheet can be easily distinguished. It is noted that in FIG. 7, printing setting information 72 of the focused on "sheet 4" is displayed.

Figure 8:
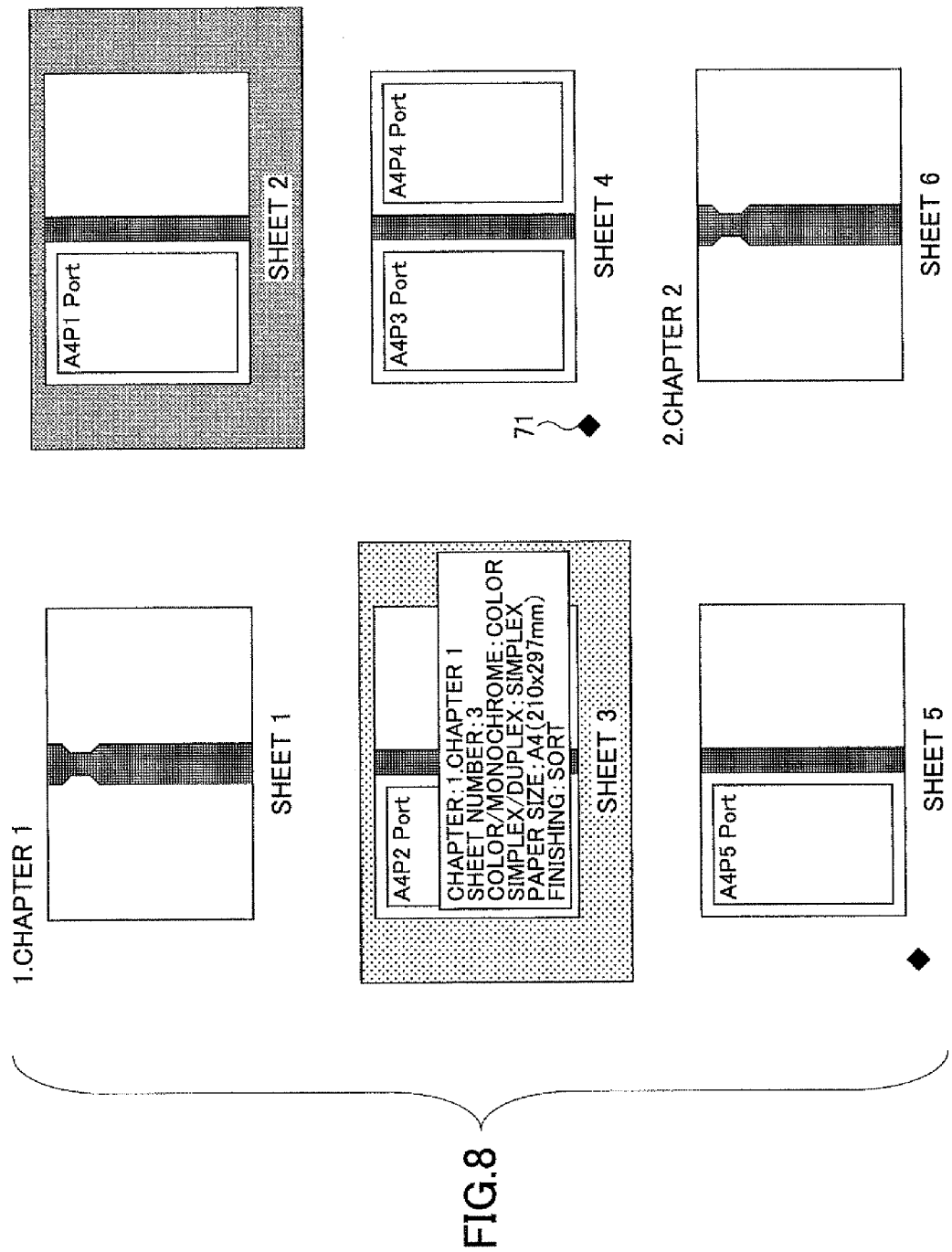
FIG. 8 shows one example of preview images displayed in the preview area when the exceptions have been partially canceled.

When the setting of duplex (exception) of the "sheet 2" is canceled to set simplex using the exception page setting area 53 in the state of FIG. 7, preview images such as those shown in FIG. 8 are displayed in the preview area 52.

FIG. 8 shows one example of preview images displayed in the preview area when the exceptions have been partially canceled. In the preview images shown in FIG. 8, since the exception of the "sheet 2" has been canceled into simplex, pages 1 and 2 on the front and back sides of the "sheet 2", respectively, in FIG. 7 of duplex are allocated to the front side of "sheet 2" of simplex and the front side of "sheet 3" of simplex, respectively. Further, as a result, pages 3 through 5 on the "sheet 3" and "sheet 4", respectively, in FIG. 7 are allocated to the "sheet 4" and "sheet 5" in FIG. 8, respectively, in a moving down (expanding) manner. Since the exception of the "sheet 2" in FIG. 7 has been thus canceled, no exception page application marks 71 are applied to the corresponding "sheet 2" and "sheet 3" in FIG. 8.

It is noted that the respective back sides of the "sheet 1" through "sheet 3" in FIG. 8 are blank since these sheets have the simplex settings. Further, the back side of the "sheet 5" in the preview image in FIG. 8 is blank, although this sheet has the duplex setting, since the front side thereof is the last page of the chapter.

Figure 9:
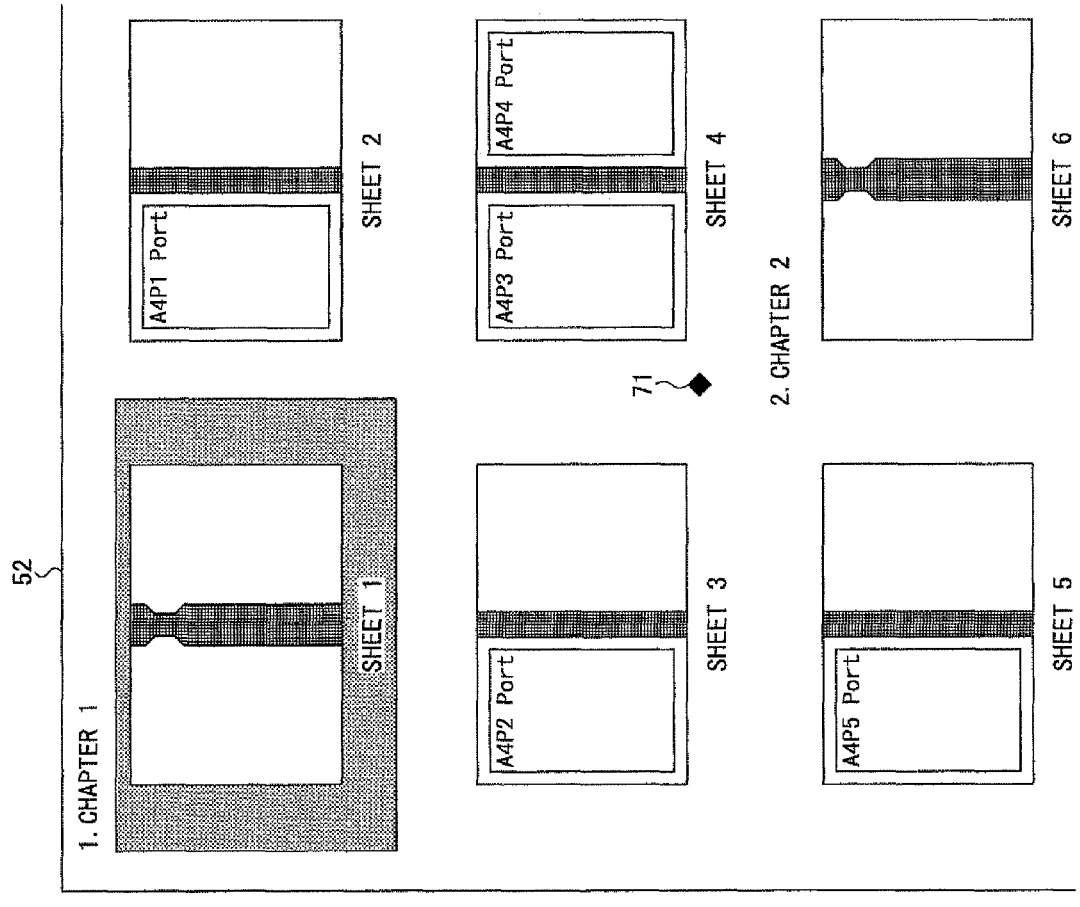
FIG. 9 shows one example of a tree display area and the preview area when the exception page has been set.

For example, when the simplex settings of "sheet 4" and "sheet 5" are set into duplex settings using the exception page setting area 53 in the case of the job editing screen page 50 of FIG. 5, preview images such as those shown in FIG. 9 are displayed in the preview area 52.

FIG. 9 shows one example of the tree display area and the preview area when the exception page has been set. The "sheet 1" through "sheet 3" have simplex settings. The "sheet 4" has duplex setting. The "sheet 5" has a simplex setting. Since the "sheet 4" is thus an exception page for which the exception has been set using the exception page setting area 53, the exception page application mark 71 is applied. As a result of the simplex setting of the "sheet 4" in FIG. 5 being thus changed into a duplex setting in FIG. 9, page 3 and page 4 on the "sheet 4" and "sheet 5", respectively, in FIG. 5 are allocated to the front and back sides of the "sheet 4" in FIG. 9, respectively. Further, as a result, page 5 on the "sheet 6" in FIG. 5 is allocated to the "sheet 5" in FIG. 9, in a moving up manner.

Further, in the tree display area 51 in FIG. 9, the information indicating simplex/duplex of the "sheet 4" has been changed to an icon indicating duplex. It is noted that in FIG. 9, the back sides of the "sheet 1" through "sheet 3" in the preview images are blank since they have the simplex settings. Also, the back side of the "sheet 5" in the preview image is blank since it has the simplex setting.

Figure 10:
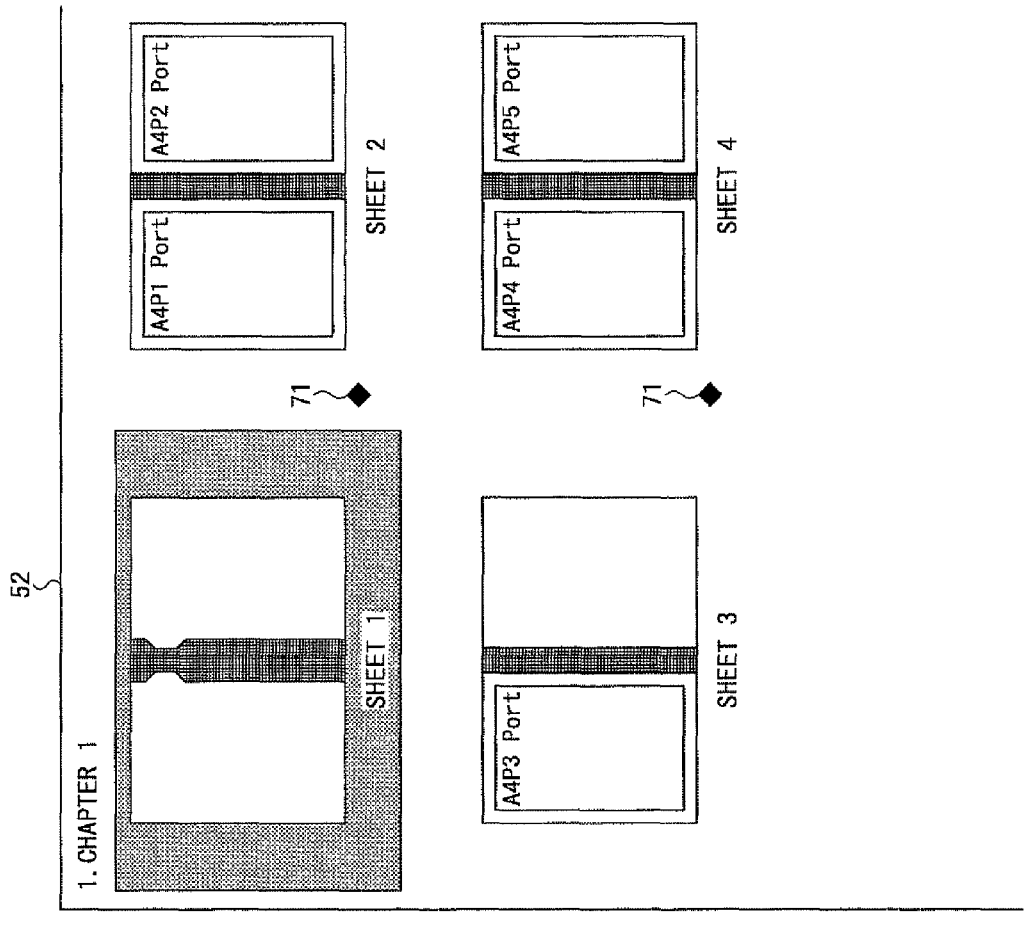
FIG. 10 shows one example of the tree display area and the preview area when the exception pages have been set.

For example, when the simplex settings of the "sheet 2" and "sheet 3" are changed to set duplex and the simplex settings of the "sheet 5" and "sheet 6" are changed to set duplex in the case of the job editing screen page 50 of FIG. 5 using the exception page setting area 53, preview images such as those shown in FIG. 10 are displayed in the preview area 52. FIG. 10 shows one example of the tree display area and the preview area when the exception pages have been set.

The "sheet 1" and "sheet 3" have simplex settings. The "sheet 2" and "sheet 4" have duplex settings. Since the "sheet 2" and "sheet 4" are thus exception pages for which the exceptions have been set using the exception page setting area 53, the exception page application marks 71 are applied, respectively. As a result of the simplex setting of the "sheet 2 in FIG. 5 being thus changed into a duplex setting in FIG. 10, page 1 and page 2 on the "sheet 2" and "sheet 3", respectively, in FIG. 5 are allocated to the front and back sides of the "sheet 2" in FIG. 10, respectively. Further, as a result, page 3 on the "sheet 4" in FIG. 5 is allocated to the "sheet 3" in FIG. 6, in a moving up manner. Similarly, as a result of the simplex setting of the "sheet 4" in FIG. 5 being thus changed into a duplex setting in FIG. 10, page 4 and page 5 on the "sheet 5" and "sheet 6", respectively, in FIG. 5 are allocated to the front and back sides of the "sheet 4" in FIG. 10, respectively. Further, in the tree display area 51, the information indicating simplex/duplex of the "sheet 2" and "sheet 4" has been changed to respective icons indicating duplex. It is noted that in FIG. 10, the back sides of the "sheet 1" and "sheet 3" in the preview images are blank since they have the simplex settings.

Further, variations of preview images displayed in the preview area 52 when an exception page is set and the exception of the exception page is canceled will now be described. Below, description will be made using figures showing the preview area 52 and preview images in a simplified manner.

FIGS. 11A and 11B show one example of preview images displayed in the preview area when exceptions of exception pages have been partially canceled. FIG. 11A shows a state in which "sheet 1" and "sheet 4" have duplex settings, and "sheet 2" and "sheet 3" have simplex settings and are exception pages.

In FIG. 11A, when the "sheet 2" is selected and the exception thereof is canceled, the preview images shown in the preview area 52 become those shown in FIG. 11B, for example. In FIG. 11B, "sheet 1", "sheet 2" and "sheet 4" have duplex settings, and "sheet 3" has a simplex setting and is an exception page. Although the "sheet 2" has a duplex setting, the back side of the "sheet 2" is blank because the "sheet 3" has a simplex setting. It is noted that, according to the embodiment of the present invention, in such a case of the "sheet 3" having a simplex setting and, in particular, being an exception page, at least the state in which the page 4 is allocated to a front side of a sheet as in FIG. 11A is kept unchanged as in FIG. 11B unless the exception setting of a sheet having the page 4 is canceled.

As a result, in FIG. 11B, the "sheet 2" of the duplex setting and "sheet 3" of the simplex setting look the same as one another in the preview images. However, the exception page ("sheet 3") can be easily distinguished as a result of the exception page application mark 71 being applied to the preview image of the "sheet 3" in the job editing screen page 50.

FIGS. 12A and 12B show another example of preview images displayed in the preview area when exceptions of exception pages have been partially canceled. FIG. 12A shows a state in which "sheet 1" and "sheet 4" have duplex settings, and "sheet 2" and "sheet 3" have simplex settings and are exception pages.

In FIG. 12A, when the "sheet 3" is selected and the exception thereof is canceled, the preview images shown in the preview area 52 become those shown in FIG. 12B, for example. In FIG. 12B, "sheet 1", "sheet 3" and "sheet 4" have duplex settings, and "sheet 2" has a simplex setting and is an exception page. Since the "sheet 3" has a duplex setting, the pages starting from page 4 are allocated, in sequence. For example, page 4 and page 5 are allocated to the front and back sides of the "sheet 3", respectively, and page 6 is allocated to the front side of the "sheet 4" and a blank page is allocated to the back side of the "sheet 4".

In FIG. 12B, the "sheet 2" of the simplex setting and "sheet 4" of the duplex setting look the same as one another in the preview images. However, the exception page ("sheet 2") can be easily distinguished as a result of the exception page application mark 71 being applied to the preview image of the "sheet 2" in the job editing screen page 50.

FIGS. 13A and 13B show one example of preview images displayed in the preview area when the exceptions of the exception pages have been canceled. For example, FIG. 13A is the same as FIG. 11A. In FIG. 13A, when the "sheet 2" and "sheet 3" are selected and the exceptions thereof are canceled, preview images shown in the preview area 52 become those shown in FIG. 13B, for example.

In FIG. 13B, the "sheet 1" through "sheet 3" have duplex settings. Since the "sheet 2" is the duplex setting, the contents of the "sheet 2" and "sheet 3" in FIG. 13A are allocated to the "sheet 2" in FIG. 13B. For example, page 3 and page 4 are allocated to the front side and back side of the "sheet 2", respectively. The exception page application marks 71 applied to the "sheet 2" and "sheet 3" in FIG. 13A are deleted in FIG. 13B since the settings of the exceptions of the "sheet 2" and "sheet 3" in FIG. 13A are thus canceled.

Figure 14C:
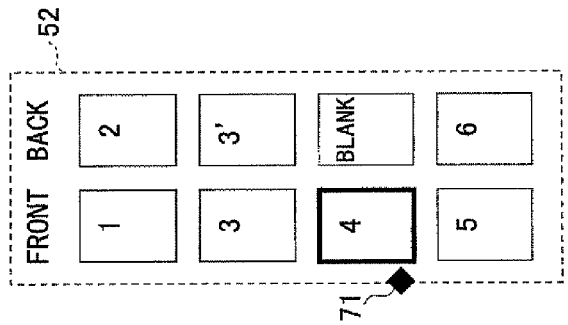
FIGS. 14A, 14B and 14C show one example of preview images displayed in the preview area when a page is inserted.
Figure 14B:
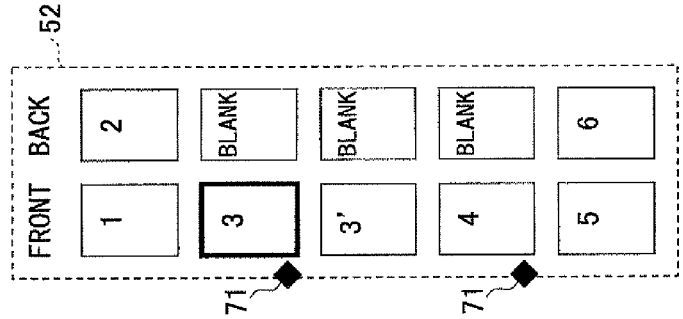
Figure 14A:
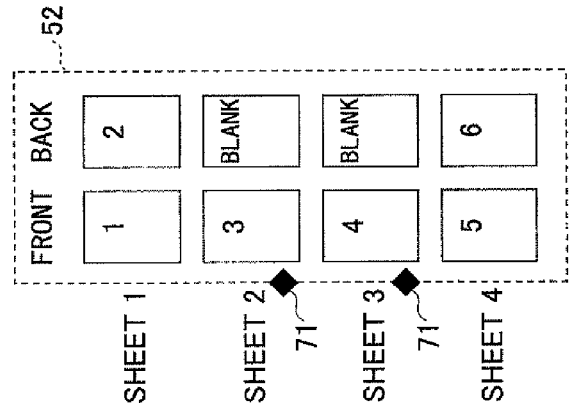
Figure 14D:
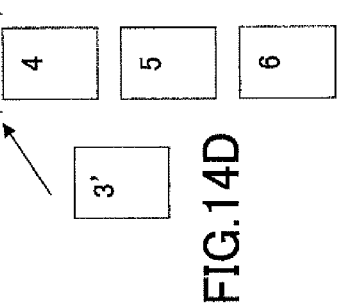
FIG. 14D shows a state of pages concerning FIGS. 14A, 14B and 14C.

FIGS. 14A, 14B and 14C show one example of preview images displayed in the preview area when a page is inserted, and FIG. 14D shows a state of pages concerning FIGS. 14A, 14B and 14C. FIG. 14A is the same as FIG. 11A. When in FIG. 14A, for example, a new page (page 3') is inserted between page 3 and page 4 as shown in FIG. 14D, preview images shown in the preview area 52 become those shown in FIG. 14B, for example.

As shown in FIG. 14B, since the "sheet 2" and "sheet 4" are exception pages and have simplex settings, the inserted new page 3' is allocated to the front side of the "sheet 3". Since the "sheet 3" in FIG. 14B is not an exception page, the "sheet 3" has a duplex setting. It is noted that the "sheet 4" in FIG. 14B has a simplex setting and, in particular, is an exception page. In such a case, according to the embodiment of the present invention, at least the state in which the page 4 is allocated to a front side of a sheet as in FIG. 14A is kept unchanged as in FIG. 14B unless the exception setting of a sheet having the page 4 is canceled. Therefore, the back side of the "sheet 3" (duplex setting) is blank.

Then, when the "sheet 2" is selected and the exception thereof is canceled in FIG. 14B, preview images shown in the preview area 52 become those shown in FIG. 14C, for example. In FIG. 14C, the "sheet 1", "sheet 2" and "sheet 4" have duplex settings, and the "sheet 3" has a simplex setting and is an exception page. Since the "sheet 2" has a duplex setting, page 3 and page 3' are allocated thereto. For example, page 3 is allocated to the front side of the "sheet 2" and page 3' is allocated to the back side of the "sheet 2", as shown in FIG. 14C. The exception page ("sheet 3") can be easily distinguished as a result of the exception page application mark 71 being applied to the preview image of the "sheet 3" in the job editing screen page 50.

FIGS. 15A, 15B and 15C show another example of preview images displayed in the preview area when a page is inserted, and FIG. 15D shows a state of pages concerning FIGS. 15A, 15B and 15C. FIG. 15A is the same as FIG. 11A. When in FIG. 15A, for example, a new page (page 2') is inserted between page 2 and page 3 as shown in FIG. 15D, preview images shown in the preview area 52 become those shown in FIG. 15B, for example.

As shown in FIG. 15B, since the "sheet 3" and "sheet 4" are exception pages and have simplex settings, the inserted new page 2' is allocated to the front side of the "sheet 2". Since the "sheet 2" is not an exception page, the "sheet 2" has a duplex setting. It is noted that the "sheet 3" and "sheet 4" in FIG. 15B have simplex settings and, in particular, are exception pages, respectively. In such a case, according to the embodiment of the present invention, at least the state in which the pages 3 and 4 are allocated to front sides of respective sheets as in FIG. 15A are kept unchanged as in FIG. 15B unless the exception settings of respective sheets having the pages 3 and 4 are canceled. Therefore, the back side of the "sheet 2" (duplex setting) is blank.

Then, when the "sheet 3" is selected and the exception thereof is canceled in FIG. 15B, the preview images shown in the preview area 52 become those shown in FIG. 15C, for example. In FIG. 15C, the "sheet 1", "sheet 2" and "sheet 4" have duplex settings, and the "sheet 3" has a simplex setting and is an exception page. Since the "sheet 2" has a duplex setting, page 2' and page 3 (allocated in the "sheet 3" in FIG. 15B, for which "sheet 3", the exception has been canceled as mentioned above) are allocated thereto, as shown in FIG. 15C. For example, page 2' is allocated to the front side of the "sheet 2" and page 3 is allocated to the back side of the "sheet 2". The exception page ("sheet 3") can be easily distinguished as a result of the exception page application mark 71 being applied to the preview image of the "sheet 3" in the job editing screen page 50.

Figure 17:
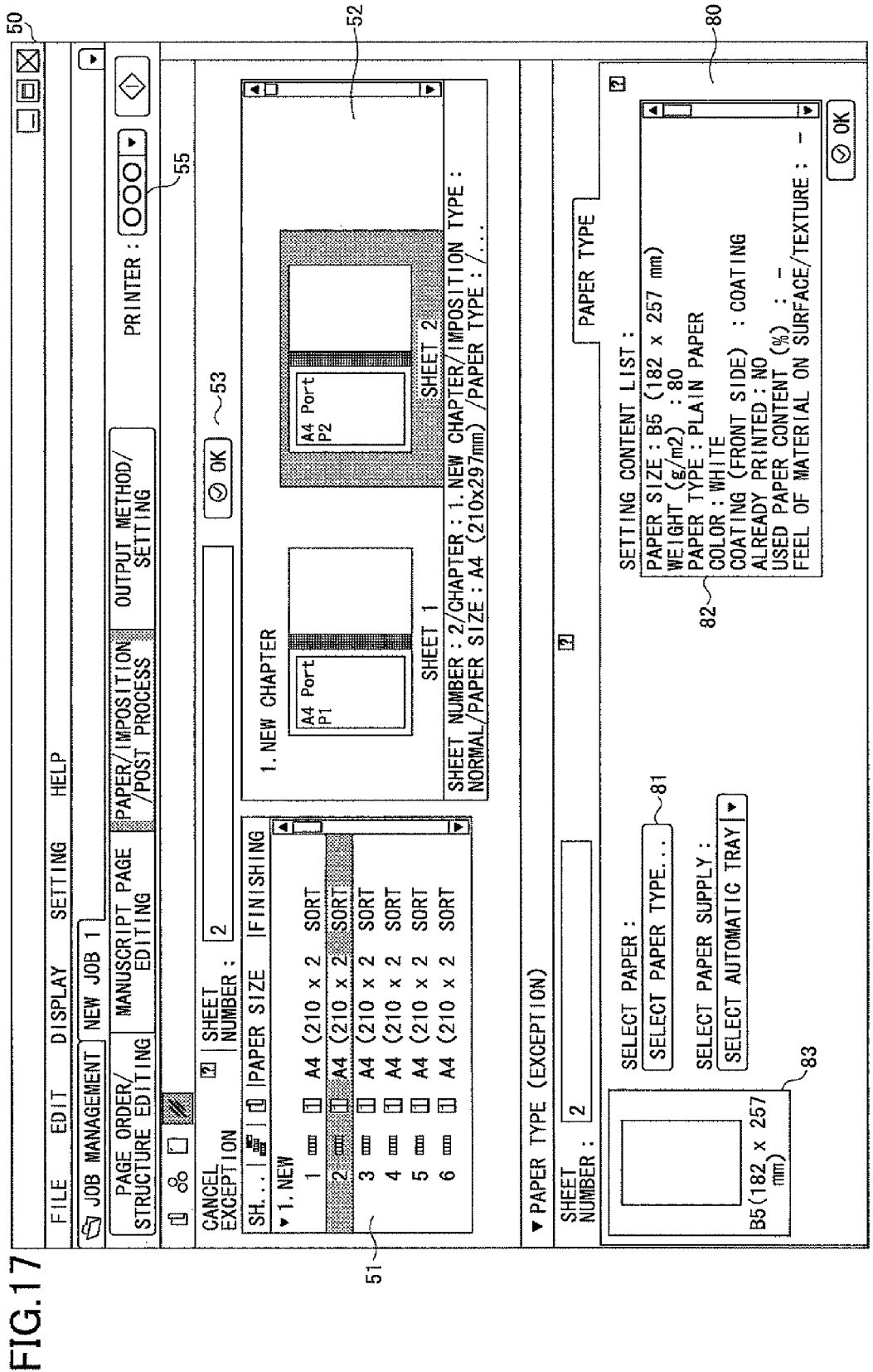
FIG. 17 shows one example of an exception page setting screen page for paper type/paper size.

When, for example, "sheet 2" is selected from the job editing screen page 50 in FIG. 16 and the exception page setting button 54 for paper type/paper size is pressed, the UI control part 32 submits, to the operator, the exception page setting screen page 80 for paper type/paper size such as that shown in FIG. 17. Then, the operator sets an exception page for paper type/paper size using the exception page setting screen page 80 for paper type/paper size.

FIG. 16 shows another example of the job editing screen page. FIG. 17 shows one example of the exception page setting screen page for paper type/paper size. The exception page setting screen page 80 for paper type/paper size of FIG. 17 has a paper type selection button 81, a setting content list display area 82 and a paper image display area 83 displaying a paper image.

Figure 18:
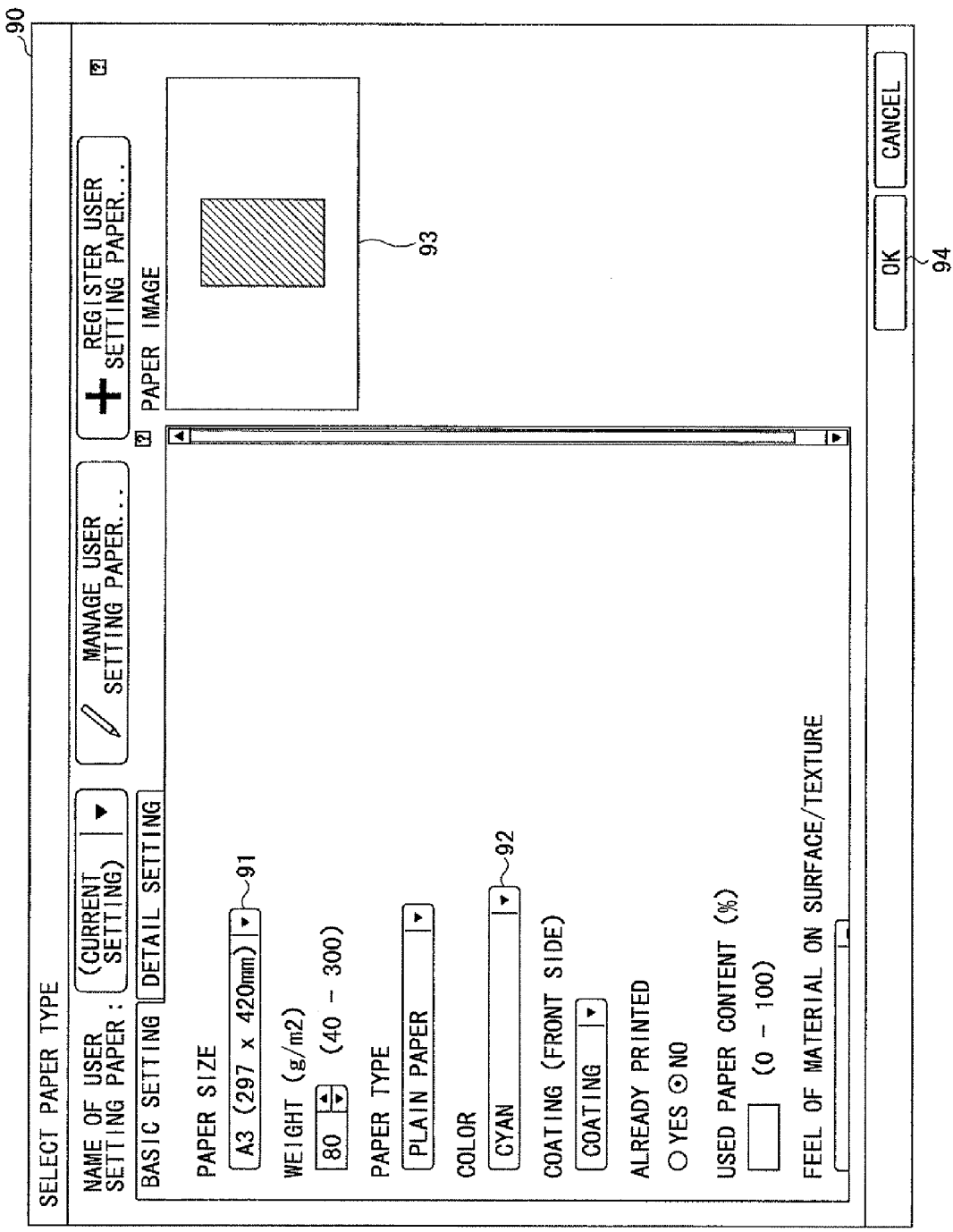
FIG. 18 shows one example of a paper type selection screen page.

The paper type selection button 81 is a button for displaying a paper type selection screen page 90 such as that shown in FIG. 18 for setting an exception (exception page) for a setting of a paper type, for each sheet. The setting content list display area 82 is an area displaying a list of setting contents of the selected "sheet 2". Further, the paper image display area 83 is an area displaying a page image of the selected "sheet 2".

FIG. 18 shows one example of the paper type selection screen page. The paper type selection screen page 90 of FIG. 18 has a pull-down menu 91 for selecting a paper size, a pull-down menu 92 for selecting a paper color and a paper image display area 93 displaying a paper image. FIG. 18 shows an example in which the paper size is set as A3 and the paper color is set as cyan. When an OK button 94 is clicked in the state of the paper type selection screen page shown in FIG. 18, the setting contents displayed in the setting content list display area 82 of FIG. 17 are changed into the setting contents displayed in the setting content list display area 82 of FIG. 19. Similarly, the paper image displayed in the paper image display area 83 of FIG. 17 is changed into the paper image displayed in the paper image display area 83 of FIG. 19.

Figure 19:
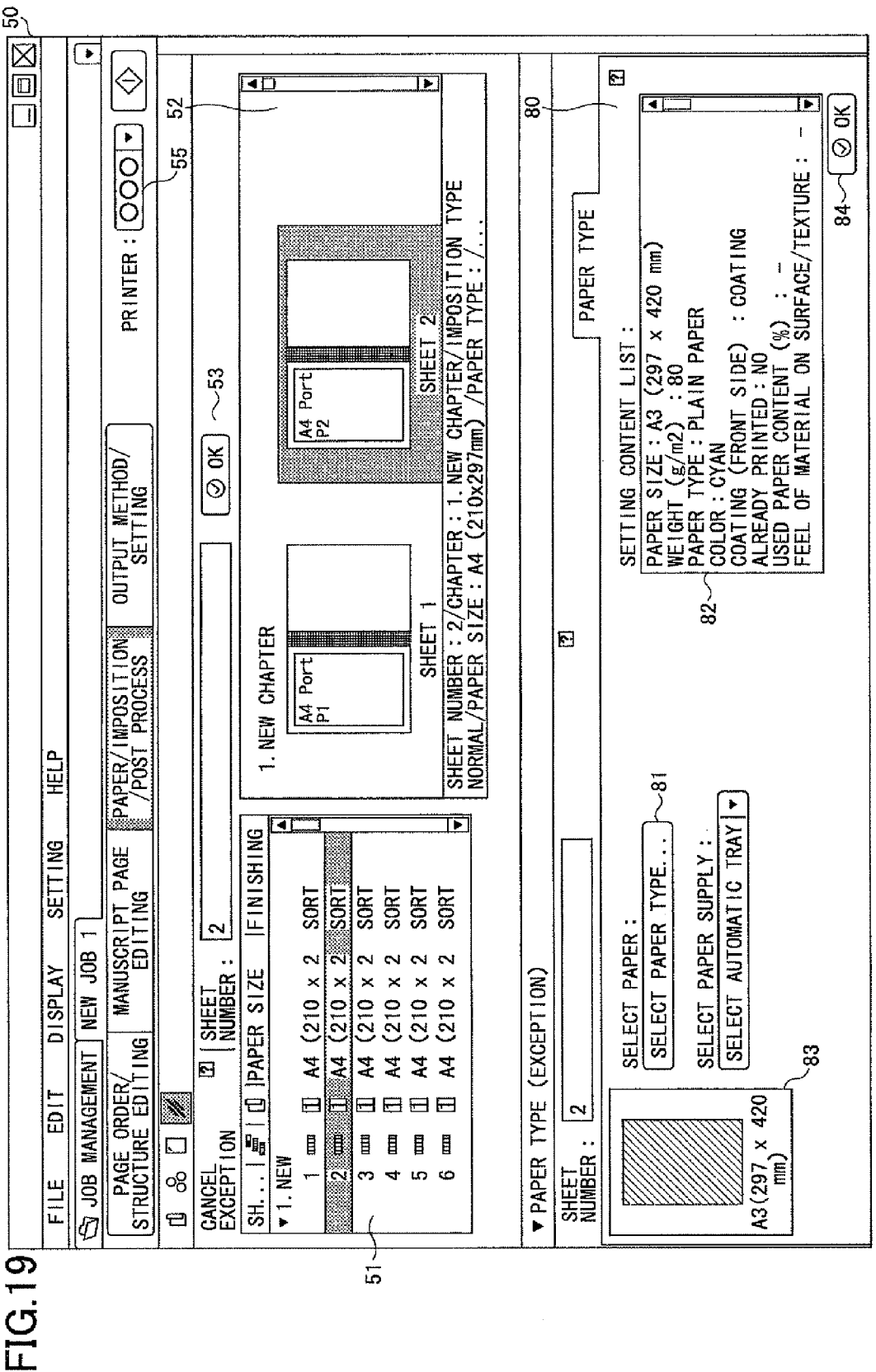
FIG. 19 shows one example of the exception page setting screen page for paper type/paper size in which setting contents displayed as a list in a setting content list display area have been changed.

FIG. 19 shows one example of the exception page setting screen page for paper type/paper size in which setting contents displayed as the list in the setting content list display area have been changed. When an OK button 84 is clicked in the state of the exception page setting screen page 80 of FIG. 19, the preview image of the "sheet 2" in the preview area 52 is changed based on the setting contents displayed in the setting content list display area 82 in the form of the list.

Figure 20:
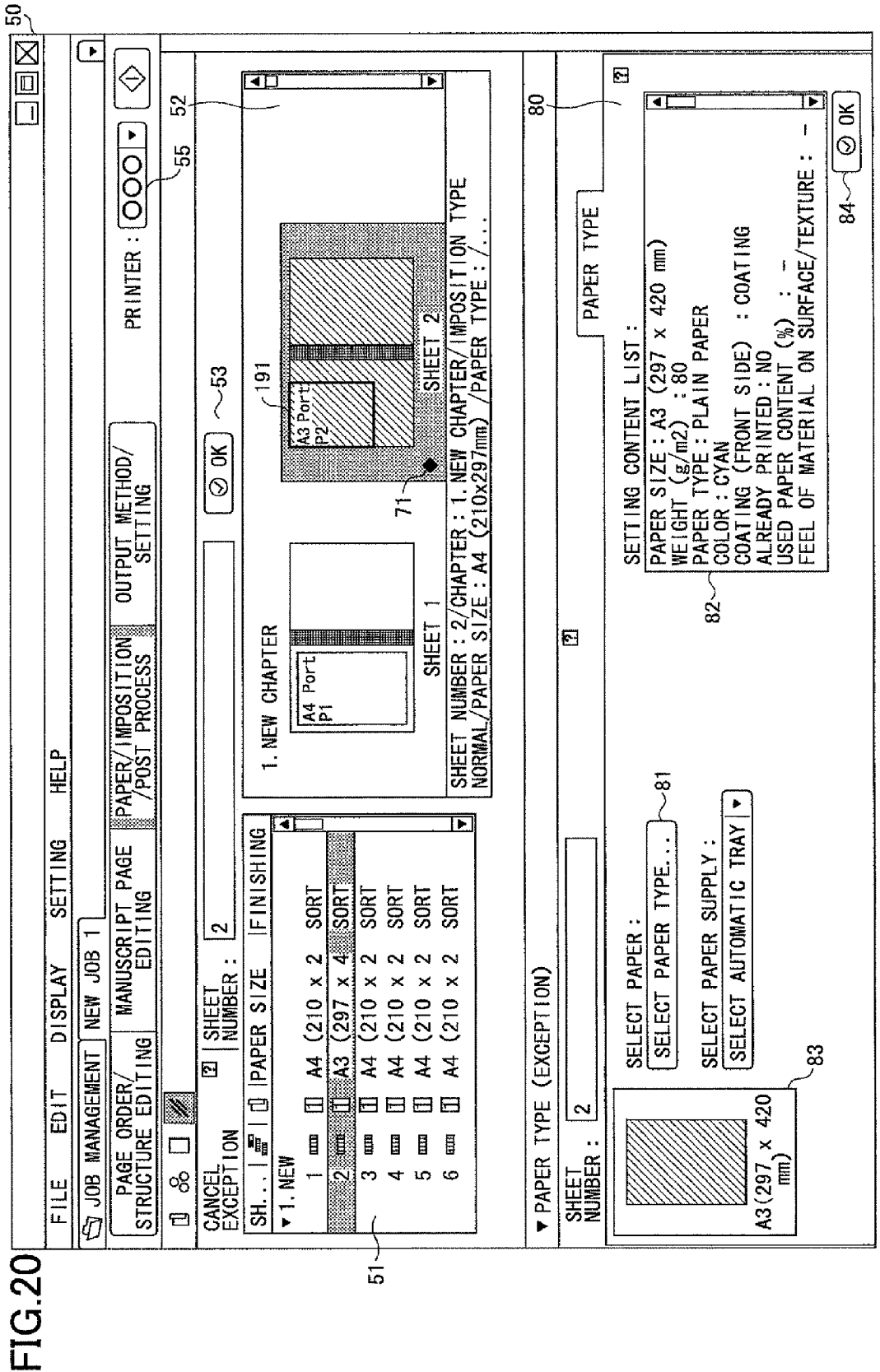
FIG. 20 shows one example of the job editing screen page in which a preview image in the preview area has been changed based on the setting contents displayed as the list in the setting content list display area.

FIG. 20 shows one example of the job editing screen page in which a preview image in the preview area has been changed based on the setting contents displayed as the list in the setting content list display area. The preview image of the "sheet 2" in the preview area 52 of the job editing screen page 50 of FIG. 20 has been changed into paper size: A3 and paper color: cyan. The exception page (sheet 2) can be easily distinguished as a result of the exception page application mark 71 being applied to the preview image of the "sheet 2" in the job editing screen page 50. Further, in the preview image of the "sheet 2" in the job editing screen page 50 of FIG. 20, the size of the manuscript is indicated as an area 191 (smaller than the paper size: A3).

Further, variations of preview images displayed in the preview area 52 when an exception page is set and the exception setting of the exception page is canceled will now be described. Below, description will be made using figures showing the preview area 52 and preview images in a simplified manner.

Figure 21A:
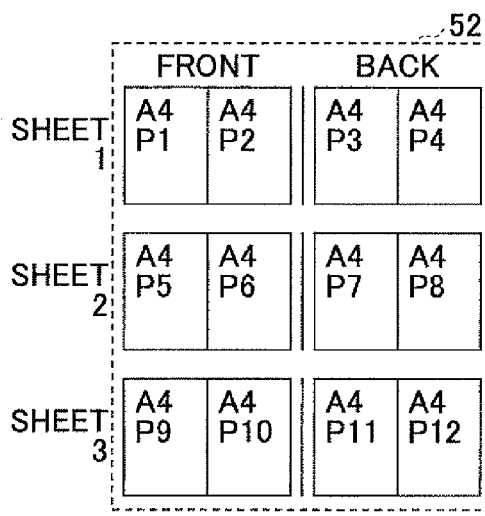
FIGS. 21A, 21B, 21C and 21D show one example of preview images displayed in the preview area when an exception page has been set.
Figure 21B:
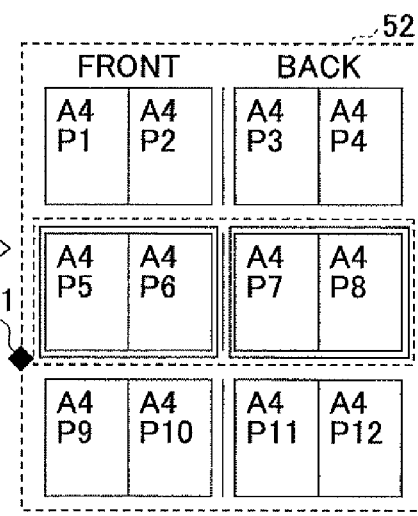

FIGS. 21A, 21B, 21C and 21D show one example of preview images displayed in the preview area when an exception page has been set. In FIG. 21A, "sheet 1" through "sheet 3" have settings of "A3 horizontal duplex 2-up". When in FIG. 21A, the "sheet 2" is selected and the paper size is changed into A3+, the preview images displayed in the preview area 52 become those shown in FIG. 21B, for example. In FIG. 21B, the "sheet 2" is an exception page and has a setting of "A3+ duplex 2-up". As shown in FIG. 21B, when the paper size indicated by the outer solid line is increased, the size of the manuscript indicated by the inner solid line is not increased.

Figure 21D:
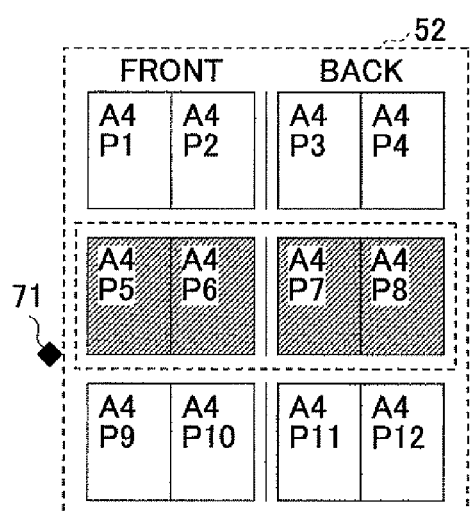
Figure 21C:
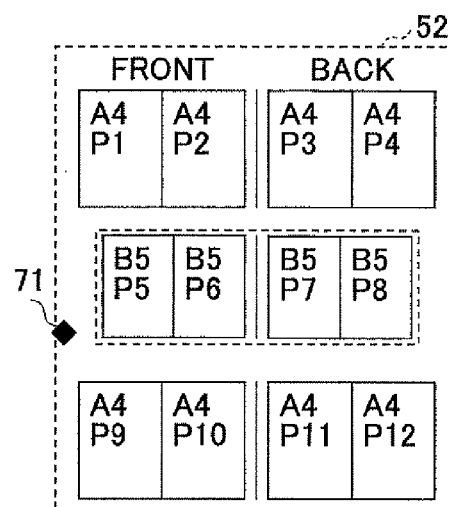

Further, when the "sheet 2" is selected in FIG. 21A and the paper size is changed into, for example, B4, the preview images displayed in the preview area 52 become those shown in FIG. 21C, for example. In FIG. 21C, the "sheet 2" is an exception page and has a setting of "B4 duplex 2-up". As shown in FIG. 21C, in a case where n-up printing is designated when the paper size is reduced into B4 from A3 as mentioned above, the size is reduced from that of the manuscript (from A4 to B5 as shown in FIG. 21C), or, in a case where further the size of the manuscript is designated, a part of the manuscript is lacking.

Further, when the "sheet 2" is selected and the paper color is changed into, for example, light blue in FIG. 21A, the preview images displayed in the preview area 52 become those shown in FIG. 21D, for example. In FIG. 21D, the "sheet 2" is an exception page and has a setting in which the paper color is set into light blue.

Figures 22A, 22B, 22C:
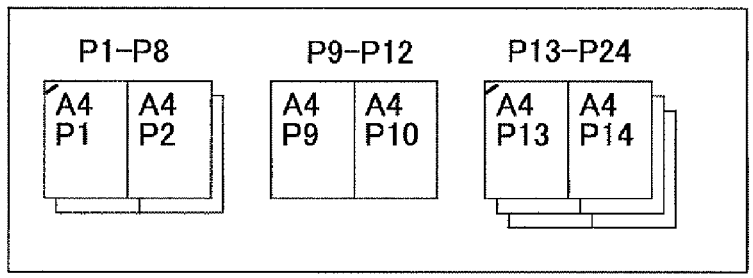
FIGS. 22A, 22B and 22C show another example of preview images displayed in the preview area when an exception page has been set.

FIGS. 22A, 22B and 22C show another example of preview images displayed in the preview area when an exception page has been set. In FIG. 22A, "sheet 1" through "sheet 6" have settings of "A3 horizontal duplex 2-up" and "top left stapling". When "sheet 3" is selected and the setting is changed to cancel "top left stapling", the preview images displayed in the preview area 52 become those shown in FIG. 22B, for example. In FIG. 22B, the "sheet 3" is an exception page and has a setting in which "top left stapling" is canceled.

When printing is carried out in the state of FIG. 22B, the printing result is that shown in FIG. 22C. Specifically, the "sheet 1" and "sheet 2" (pages 1-8) are printed according to the setting of "A3 horizontal duplex 2-up" and "top left stapling". Also, the "sheet 4" through "sheet 6" (pages 13-24) are printed according to the setting of "A3 horizontal duplex 2-up" and "top left stapling". The "sheet 3" (pages 9-12) is printed according to the setting of "A3 horizontal duplex 2-up" without "top left stapling".

FIGS. 23A and 23B show another example of preview images displayed in the preview area when an exception page has been set. In FIG. 23A, "sheet 1" through "sheet 4" have settings of duplex and color printing. When "sheet 2" is selected and the setting is changed from color printing into monochrome printing, the preview images displayed in the preview area 52 become those shown in FIG. 23B, for example. In FIG. 23B, the "sheet 2" is an exception page and has a setting of monochrome printing.

It is noted that the job editing part 33 carries out processing of flowchart such as that shown in FIG. 24 for realizing applying the exception page application mark 71 to a preview image. FIG. 24 is a flowchart of one example showing a procedure of processing carried out by the job editing part.

In step S1 of FIG. 24, the job editing part 33 determines whether an exception setting for simplex/duplex has been made using the job editing screen page 50. When an exception setting for simplex/duplex has been made by the operator using the job editing screen page 50 (YES), the job editing part 33 changes an exception page setting included in job information of the sheet into ON, and changes the setting of "simplex/duplex" into the setting of the exception, in step S2.

When no exception setting for simplex/duplex has been made by the operator using the job editing screen page 50 (step S1 NO), the job editing part 33 carries out step S3. Further, the job editing part 33 carries out step S3 after carrying out step S2.

In step S3, the job editing part 33 determines whether an exception setting for color/monochrome has been made using the job editing screen page 50. When an exception setting for color/monochrome has been made by the operator using the job editing screen page 50 (YES), the job editing part 33 changes the exception page setting included in the job information of the sheet into ON, and changes the setting of "color/monochrome" into the setting of the exception, in step S4.

When no exception setting for color/monochrome has been made by the operator using the job editing screen page 50 (step S3 NO), the job editing part 33 carries out step S5. Further, the job editing part 33 carries out step S5 after carrying out step S4.

In step S5, the job editing part 33 determines whether an exception setting for stapling has been made using the job editing screen page 50. When an exception setting for stapling has been made by the operator using the job editing screen page 50 (YES), the job editing part 33 changes the exception page setting included in the job information of the sheet into ON, and changes the setting of whether to carry out "stapling" into the setting of the exception, in step S6.

When no exception setting for stapling has been made by the operator using the job editing screen page 50 (step S5 NO), the job editing part 33 carries out step S7. Further, the job editing part 33 carries out step S7 after carrying out step S6.

In step S7, the job editing part 33 determines whether an exception setting for paper type/paper size has been made using the job editing screen page 50. When an exception setting for paper type/paper size has been made by the operator using the job editing screen page 50 (YES), the job editing part 33 changes the exception page setting included in the job information of the sheet into ON, and changes the setting of "paper type/paper size" into the setting of the exception, in step S8. When no exception setting for paper type/paper size has been made by the operator using the job editing screen page 50 (step S7 NO), or when carrying out step S8, the job editing part 33 finishes the processing of FIG. 24.

It is noted that the job information is stored in the auxiliary storage unit 24, for example. The job information may be stored in the main storage unit 25.

Further, the job editing part 33 carries out processing of a flowchart of FIG. 25 for displaying the exception page application mark 71 for a preview image. FIG. 25 is a flowchart of another example showing a procedure of processing carried out by the job editing part.

In step S11, the job editing part 33 reads the job information of the sheet stored in the auxiliary storage unit 24, for example, and determines whether an exception setting for simplex/duplex has been made. When an exception setting for simplex/duplex has been made (YES), the job editing part 33 reflects the contents of the exception setting for simplex/duplex on the preview image displayed in the preview area 52, and also, displays the exception page application mark 71, in step S12.

When no exception setting for simplex/duplex has been made (step S11 NO), the job editing part 33 carries out step S13. Further, the job editing part 33 carries out step S13 after carrying out step S12.

In step S13, the job editing part 33 reads the job information of the sheet stored in the auxiliary storage unit 24, for example, and determines whether an exception setting for color/monochrome has been made. When an exception setting for color/monochrome has been made (YES), the job editing part 33 reflects the contents of the exception setting for color/monochrome on the preview image displayed in the preview area 52, and also, displays the exception page application mark 71, in step S14. When no exception setting for color/monochrome has been made (step S13 NO), the job editing part 33 carries out step S15. Further, the job editing part 33 carries out step S15 after carrying out step S14.

In step S15, the job editing part 33 reads the job information of the sheet recorded in the auxiliary storage unit 24, for example, and determines whether an exception setting for stapling has been made. When an exception setting for stapling has been made (YES), the job editing part 33 reflects the contents of the exception setting for stapling on the preview image displayed in the preview area 52, and also, displays the exception page application mark 71, in step S16.

When no exception setting for stapling has been made (step S15 NO), the job editing part 33 carries out step S17. Further, the job editing part 33 carries out step S17 after carrying out step S16.

In step S17, the job editing part 33 reads the job information of the sheet recorded in the auxiliary storage unit 24, for example, and determines whether an exception setting for paper type/paper size has been made. When an exception setting for paper type/paper size has been made (YES), the job editing part 33 reflects the contents of the exception setting for paper type/paper size on the preview image displayed in the preview area 52, and also, displays the exception page application mark 71, in step S18. When no exception setting for paper type/paper size has been made (step S17 NO) or after step S18 is carried out, the job editing part 33 finishes the processing of FIG. 25.

Thus, according to the embodiments of the present invention, in a case where an exception is set or is not set for each sheet, it is possible to carry out an editing operation such as a setting of an exception and/or canceling the exception while displaying the corresponding preview image in the preview area 52. Therefore, it is possible to obtain the expected printing result (printed output pages) easily.

Further, according to the embodiments of the present invention, it is possible to display a preview image displayed in the preview area 52 according to an actual physical arrangement on the sheet of paper. For example, even in a case of a setting of simplex, the preview image includes a back side that is blank accordingly.

It is noted that according to the embodiments of the present invention, the problem of it being not easy to determine whether a preview image corresponds to a setting of simplex or a setting of duplex when the preview image displayed in the preview area 52 is displayed according to the actual physical arrangement on the sheet of paper is solved. The problem is solved by applying the exception page application mark 71 to an exception page, whereby the exception page can be easily distinguished. According to the embodiments of the present invention, it is possible to easily determine whether a preview image which is being displayed is a preview image of an exception page even when a preview image of an exception page looks the same as a preview image that is not an exception page, by applying the exception page application mark 71 to the exception page.

The present invention is not limited to the specifically disclosed embodiments, and variations and modifications may be made without departing from the scope of the present invention.

It is noted that a part configured to display on a display unit, a job editing screen page, and a part configured to display information indicating that an exception for a printing setting has been set, correspond to the UI control part 32. A printing setting editing program corresponds to the printing control program. A printing setting editing apparatus corresponds to the printing control PC 12.

The present patent application is based on Japanese Priority Patent Application No. 2011-020219 filed Feb. 1, 2011, the entire contents of which are hereby incorporated herein by reference.

What is claimed is:

1. A non-transitory computer readable information recording medium storing a printing setting editing program which when executed by one or plural processors, performs functions of:

a part configured to display on a display unit a job editing screen page including a preview area displaying preview images, sheet by sheet, obtained from modifying given data according to a printing setting, wherein a first preview image is displayed as though on a front side of a sheet and a second preview image is displayed as though on a back side of the sheet and wherein the first preview image and the second preview image are displayed beside each other and an exception page setting area used for setting an exception for the printing setting by sheet, for the displayed first preview image and second preview image; and a part configured to apply information, indicating that the exception for the printing setting has been set on a sheet, to each preview image, of the preview images being displayed in the preview area, which preview image corresponds to the sheet for which the exception for the printing setting has been set, and display the information.

2. The computer readable information recording medium as claimed in claim 1, wherein the part configured to display the job editing screen page on the display unit is configured to cancel, in the exception page setting area, the exception for the printing setting that has been set by sheet.

3. The computer readable information recording medium as claimed in claim 2, wherein the exception for the printing setting is selected from settings of monochrome/color, simplex/duplex, stapling and paper type/paper size.

4. The computer readable information recording medium as claimed in claim 3, wherein the part configured to display the job editing screen page on the display unit is configured to display the preview image of a sheet having the printing setting of simplex, which preview image includes a back side that is blank.

5. The computer readable information recording medium as claimed in claim 1, wherein the exception for the printing setting is selected from settings of monochrome/color, simplex/duplex, stapling and paper type/paper size.

6. The computer readable information recording medium as claimed in claim 5, wherein the part configured to display the job editing screen page on the display unit is configured to display the preview image of a sheet having the printing setting of simplex, which preview image includes a back side that is blank.

7. A printing setting editing apparatus configured to:

display on a display unit a job editing screen page including a preview area displaying preview images, sheet by sheet, obtained from modifying given data according to a printing setting, wherein a first preview image is displayed as though on a front side of a sheet and a second preview image is displayed as though on a back side of the sheet and wherein the first preview image and the second preview image are displayed beside each other and an exception page setting area used for setting an exception for the printing setting by sheet for the displayed first preview image and second preview image; and apply information, indicating that the exception for the printing setting has been set on a sheet, to each preview image, of the preview images being displayed in the preview area, which preview image corresponds to the sheet for which the exception for the printing setting has been set, and display the information.

8. A printing setting editing method comprising:

displaying, by a computer, on a display unit a job editing screen page including a preview area displaying preview images, sheet by sheet, obtained from modifying given data according to a printing setting, wherein a first preview image is displayed as though on a front side of a sheet and a second preview image is displayed as though on a back side of the sheet and wherein the first preview image and the second preview image are displayed beside each other and an exception page setting area used for setting an exception for the printing setting by sheet for the displayed first preview image and second preview image; and applying, by the computer, information indicating that the exception for the printing setting has been set on a sheet, to each preview image, of the preview images being displayed in the preview area, which preview image corresponds to the sheet for which the exception for the printing setting has been set, and displaying, by the computer, the information.

* * * * *